(12) United States Patent
Khoshnevisan et al.

(10) Patent No.: US 11,611,983 B2
(45) Date of Patent: Mar. 21, 2023

(54) ACKNOWLEDGEMENT FEEDBACK FOR MULTI-COMPONENT CARRIER SCHEDULING

(71) Applicant: QUALCOMM Incorporated, San Diego, CA (US)

(72) Inventors: Mostafa Khoshnevisan, San Diego, CA (US); Kazuki Takeda, Tokyo (JP); Xiaoxia Zhang, San Diego, CA (US); Peter Gaal, San Diego, CA (US); Wanshi Chen, San Diego, CA (US); Alberto Rico Alvarino, San Diego, CA (US); Huilin Xu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 94 days.

(21) Appl. No.: 17/172,486

(22) Filed: Feb. 10, 2021

(65) Prior Publication Data

US 2021/0266943 A1 Aug. 26, 2021

Related U.S. Application Data

(60) Provisional application No. 62/978,925, filed on Feb. 20, 2020.

(51) Int. Cl.
*H04W 4/00* (2018.01)
*H04W 72/12* (2023.01)
(Continued)

(52) U.S. Cl.
CPC ....... *H04W 72/1289* (2013.01); *H04L 1/1819* (2013.01); *H04L 5/0055* (2013.01);
(Continued)

(58) Field of Classification Search
None
See application file for complete search history.

(56) References Cited

U.S. PATENT DOCUMENTS

| 2019/0273544 A1* | 9/2019 | Cha | H04B 7/06 |
| 2020/0128578 A1* | 4/2020 | Park | H04W 72/0446 |

FOREIGN PATENT DOCUMENTS

EP 3518600 A1 7/2019

OTHER PUBLICATIONS

International Search Report and Written Opinion—PCT/US2021/017704—ISA/EPO—dated Jun. 22, 2021.
(Continued)

*Primary Examiner* — Zewdu A Beyen
(74) *Attorney, Agent, or Firm* — Holland & Hart LLP

(57) ABSTRACT

Methods, systems, and devices for wireless communications are described. A user equipment (UE) to provide hybrid automatic repeat request (HARQ) feedback for multiple physical channels (e.g., multiple physical downlink shared channels (PDSCH)) scheduled via cross component carrier. The UE may monitor control channel occasions, to receive wireless communications from a base station. For example, the UE may receive downlink control information (DCI) messages that may schedule multiple PDSCH over different component carriers. The DCI messages may include an indication of a timing offset for HARQ feedback for the multiple PDSCH. In some examples, the UE may be configured to receive multiple DCI messages and order the DCI messages based on component carrier indices or a PDCCH occasion, or both. The UE may then determine a slot to transmit HARQ feedback for the multiple PDSCH based on an indication in a latest DCI message identified according to the ordering.

30 Claims, 20 Drawing Sheets

(51) Int. Cl.
*H04L 27/26* (2006.01)
*H04L 1/1812* (2023.01)
*H04L 5/00* (2006.01)
*H04W 72/0446* (2023.01)

(52) U.S. Cl.
CPC ... *H04L 27/26025* (2021.01); *H04W 72/0446* (2013.01); *H04W 72/1257* (2013.01)

(56) References Cited

OTHER PUBLICATIONS

NTT DOCOMO., et al., "Remaining Issues CA and Type1 HARQ-ACK Codebook", 3GPP TSG RAN WG1 Meeting #93, 3GPP Draft; R1-1807071, 3rd Generation Partnership Project (3GPP), Mobile Competence Centre; 650, Route Des Lucioles; F-06921 Sophia-Antipolis Cedex; France, vol. RAN WG1, No. Busan, Korea; May 21, 2018-May 25, 2018, May 20, 2018 (May 20, 2018), pp. 1-10, XP051442269, Retrieved from the Internet: URL: http://www.3gpp.org/ftp/Meetings%5F3GPP%5FSYNC/RAN1/Docs/ [retrieved on May 20, 2018], The whole document.

\* cited by examiner

US 11,611,983 B2

ACKNOWLEDGEMENT FEEDBACK FOR MULTI-COMPONENT CARRIER SCHEDULING

CROSS REFERENCE

The present Application for Patent claims the benefit of U.S. Provisional Patent Application No. 62/978,925 by KHOSHNEVISAN et al., entitled "ACKNOWLEDGMENT FEEDBACK FOR MULTI-COMPONENT CARRIER SCHEDULING," filed Feb. 20, 2020, assigned to the assignee hereof, and expressly incorporated by reference herein.

FIELD OF TECHNOLOGY

The present disclosure relates to wireless communications and more specifically to acknowledgement feedback for multi-component carrier scheduling.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM).

A wireless multiple-access communications system may include one or more base stations or one or more network access nodes, each simultaneously supporting communication for multiple communication devices, which may be otherwise known as user equipment (UE). Some wireless communications systems, such as 4G and 5G systems, may support multiple component carriers for communications between UEs and base stations.

SUMMARY

Various aspects of the described techniques relate to configuring a communication device, which may otherwise be known as user equipment (UE), to provide hybrid automatic repeat request (HARQ) feedback for multiple physical channels (e.g., multiple physical downlink shared channels (PDSCH)) scheduled via cross component carrier, for example, in fifth generation (5G) systems. The UE may monitor control channel occasions (e.g., physical downlink control channel (PDCCH) occasions), to receive wireless communications from another communication device (e.g., a base station, such as a next-generation NodeBs (gNB)). For example, the UE may receive downlink control information (DCI) messages that may schedule multiple PDSCH over different component carriers from the base station. The DCI messages may include an indication of a timing offset for HARQ feedback for the multiple PDSCH. In some examples, the UE may be configured to receive multiple DCI messages and order the DCI messages based in part on component carrier indices or a PDCCH occasion, or both. The UE may then determine a slot to transmit HARQ feedback for the multiple PDSCH based on an indication in a latest DCI message identified according to the ordering.

The UE may thus transmit HARQ feedback for the multiple PDSCH. In addition, the UE may improve coverage for wireless communications by supporting HARQ feedback for multiple PDSCH scheduled via cross component carrier. The UE may also provide increased flexibility for wireless communications (e.g., control information, data) and improvements to the reliability of the wireless communications in 5G systems. For example, the UE may receive multiple PDSCH over multiple carriers and acknowledge receipt of each of the multiple PDSCH by providing HARQ feedback, while maintaining low signaling overhead and system flexibility. The described techniques may include features for improvements to power consumption and, in some examples, may promote enhanced efficiency for high reliability and low latency operations in 5G systems, among other benefits.

A method of wireless communication at a UE is described. The method may include receiving a DCI message scheduling a first transmission on a first downlink data channel of a first component carrier and a second transmission on a second downlink data channel of a second component carrier, the received DCI message providing an indication of a timing offset for acknowledgement information associated with the first transmission and the second transmission, selecting, based on a selection rule, one of a first slot or a second slot, the first slot associated with the first transmission on the first downlink data channel and the second slot associated with the second transmission on the second downlink data channel, determining, based on the indicated timing offset and the selected one of the first slot or the second slot, a third slot to use to transmit the acknowledgement information, and transmitting, during the determined third slot, the acknowledgement information associated with the first transmission and the second transmission on a control channel.

An apparatus for wireless communication is described. The apparatus may include a processor, memory coupled with the processor, and instructions stored in the memory. The instructions may be executable by the processor to cause the apparatus to receive a DCI message scheduling a first transmission on a first downlink data channel of a first component carrier and a second transmission on a second downlink data channel of a second component carrier, the received DCI message providing an indication of a timing offset for acknowledgement information associated with the first transmission and the second transmission, select, based on a selection rule, one of a first slot or a second slot, the first slot associated with the first transmission on the first downlink data channel and the second slot associated with the second transmission on the second downlink data channel, determine, based on the indicated timing offset and the selected one of the first slot or the second slot, a third slot to use to transmit the acknowledgement information, and transmit, during the determined third slot, the acknowledgement information associated with the first transmission and the second transmission on a control channel.

Another apparatus for wireless communication is described. The apparatus may include means for receiving a DCI message scheduling a first transmission on a first downlink data channel of a first component carrier and a second transmission on a second downlink data channel of a second component carrier, the received DCI message providing an indication of a timing offset for acknowledgement information associated with the first transmission and the second transmission, selecting, based on a selection rule, one of a first slot or a second slot, the first slot associated with the first transmission on the first downlink data channel and the second slot associated with the second transmission on the second downlink data channel, determining, based on the indicated timing offset and the selected one of the first slot or the second slot, a third slot to use to transmit the acknowledgement information, and transmitting, during the determined third slot, the acknowledgement information associated with the first transmission and the second transmission on a control channel.

A non-transitory computer-readable medium storing code for wireless communication at a UE is described. The code may include instructions executable by a processor to receive a DCI message scheduling a first transmission on a first downlink data channel of a first component carrier and a second transmission on a second downlink data channel of a second component carrier, the received DCI message providing an indication of a timing offset for acknowledgement information associated with the first transmission and the second transmission, select, based on a selection rule, one of a first slot or a second slot, the first slot associated with the first transmission on the first downlink data channel and the second slot associated with the second transmission on the second downlink data channel, determine, based on the indicated timing offset and the selected one of the first slot or the second slot, a third slot to use to transmit the acknowledgement information, and transmit, during the determined third slot, the acknowledgement information associated with the first transmission and the second transmission on a control channel.

In some examples of the method, apparatuses, and non-transitory computer-readable medium described herein, the first component carrier corresponds to a first subcarrier spacing and the second component carrier corresponds to a second subcarrier spacing different than the first subcarrier spacing.

Some examples of the method, apparatuses, and non-transitory computer-readable medium described herein may further include operations, features, means, or instructions for determining the third slot to use to transmit the acknowledgement information may be based on the first subcarrier spacing or the second subcarrier spacing, or both.

In some examples of the method, apparatuses, and non-transitory computer-readable medium described herein, the third slot includes a slot to transmit the acknowledgement information associated with the first transmission and the second transmission.

Some examples of the method, apparatuses, and non-transitory computer-readable medium described herein may further include operations, features, means, or instructions for identifying a first indicator of a set of indicators in the received DCI message, the first indicator including a first time domain resource allocation field for the first downlink data channel associated with the first component carrier, identifying a second indicator of the set of indicators in the received DCI message, the second indicator including a second time domain resource allocation field for the second downlink data channel associated with the second component carrier, and where determining the third slot to use to transmit the acknowledgement information may be based on the first and second time domain resource allocation fields.

Some examples of the method, apparatuses, and non-transitory computer-readable medium described herein may further include operations, features, means, or instructions for identifying an indicator of a set of indicators in the received DCI message, the indicator including a time domain resource allocation field for both the first downlink data channel associated with the first component carrier and the second downlink data channel associated with the second component carrier, and where determining the third slot to use to transmit the acknowledgement information may be based on the time domain resource allocation field.

Some examples of the method, apparatuses, and non-transitory computer-readable medium described herein may further include operations, features, means, or instructions for determining, based on the received DCI message, a beginning slot of the first downlink data channel associated with the first component carrier, an ending slot of the first downlink data channel associated with the first component carrier, or a duration of the first downlink data channel associated with the first component carrier, or a combination thereof, and where determining the third slot to use to transmit the acknowledgement information may be based on the beginning slot of the first downlink data channel, the ending slot of the first downlink data channel, or the duration of the first downlink data channel, or a combination thereof.

Some examples of the method, apparatuses, and non-transitory computer-readable medium described herein may further include operations, features, means, or instructions for determining, based on the received DCI message, a beginning slot of the second downlink data channel associated with the second component carrier, an ending slot of the second downlink data channel associated with the second component carrier, or a duration of the second downlink data channel associated with the second component carrier, or a combination thereof, and where determining the third slot to use to transmit the acknowledgement information may be based on the beginning slot of the second downlink data channel, the ending slot of the second downlink data channel, or the duration of the second downlink data channel, or a combination thereof.

Some examples of the method, apparatuses, and non-transitory computer-readable medium described herein may further include operations, features, means, or instructions for scaling one or more of the beginning slot of the first downlink data channel, the ending slot of the first downlink data channel, the duration of the first downlink data channel, the beginning slot of the second downlink data channel, the ending slot of the second downlink data channel, or the duration of the second downlink data channel, or a combination thereof.

In some examples of the method, apparatuses, and non-transitory computer-readable medium described herein, transmitting the acknowledgement information associated with the first transmission and the second transmission on the control channel may include operations, features, means, or instructions for excluding, based at last in part on an absence of the timing offset in a set of timing offsets, feedback associated with the first downlink data channel or the second downlink data channel from the acknowledgement information associated with the first transmission and the second transmission on the control channel.

In some examples of the method, apparatuses, and non-transitory computer-readable medium described herein, the selection rule includes selecting one of the first slot or the second slot based on the first slot occurring before the second slot.

In some examples of the method, apparatuses, and non-transitory computer-readable medium described herein, the selection rule includes selecting one of the first slot or the second slot based on the first slot occurring after the second slot.

In some examples of the method, apparatuses, and non-transitory computer-readable medium described herein, the selection rule includes selecting one of the first slot or the second slot based at least in part on a first component carrier index associated with the first component carrier and a second component carrier index associated with the second component carrier.

A method of wireless communication at a base station is described. The method may include transmitting a DCI message scheduling a first transmission on a first downlink data channel of a first component carrier and a second transmission on a second downlink data channel of a second component carrier, the transmitted DCI message providing an indication of a timing offset for acknowledgement information associated with the first transmission and the second transmission, a first slot associated with the first transmission on the first downlink data channel and a second slot associated with the second transmission on the second downlink data channel, determining, based at least in part on the timing offset and one of the first slot or the second slot, a third slot for receiving the acknowledgement information, and receiving, during a third slot, the acknowledgement information associated with the first transmission and the second transmission on a control channel.

An apparatus for wireless communication is described. The apparatus may include a processor, memory coupled with the processor, and instructions stored in the memory. The instructions may be executable by the processor to cause the apparatus to transmit a DCI message scheduling a first transmission on a first downlink data channel of a first component carrier and a second transmission on a second downlink data channel of a second component carrier, the transmitted DCI message providing an indication of a timing offset for acknowledgement information associated with the first transmission and the second transmission, a first slot associated with the first transmission on the first downlink data channel and a second slot associated with the second transmission on the second downlink data channel, determine, based at least in part on the timing offset and one of the first slot or the second slot, a third slot for receiving the acknowledgement information, and receive, during a third slot, the acknowledgement information associated with the first transmission and the second transmission on a control channel.

Another apparatus for wireless communication is described. The apparatus may include means for transmitting a DCI message scheduling a first transmission on a first downlink data channel of a first component carrier and a second transmission on a second downlink data channel of a second component carrier, the transmitted DCI message providing an indication of a timing offset for acknowledgement information associated with the first transmission and the second transmission, a first slot associated with the first transmission on the first downlink data channel and a second slot associated with the second transmission on the second downlink data channel, determine, based at least in part on the timing offset and one of the first slot or the second slot, a third slot for receiving the acknowledgement information, and receiving, during a third slot, the acknowledgement information associated with the first transmission and the second transmission on a control channel.

A non-transitory computer-readable medium storing code for wireless communication at a base station is described. The code may include instructions executable by a processor to transmit a DCI message scheduling a first transmission on a first downlink data channel of a first component carrier and a second transmission on a second downlink data channel of a second component carrier, the transmitted DCI message providing an indication of a timing offset for acknowledgement information associated with the first transmission and the second transmission, a first slot associated with the first transmission on the first downlink data channel and a second slot associated with the second transmission on the second downlink data channel, determine, based at least in part on the timing offset and one of the first slot or the second slot, a third slot for receiving the acknowledgement information, and receive, during a third slot, the acknowledgement information associated with the first transmission and the second transmission on a control channel.

In some examples of the method, apparatuses, and non-transitory computer-readable medium described herein, the first component carrier corresponds to a first subcarrier spacing and the second component carrier corresponds to a second subcarrier spacing different than the first subcarrier spacing.

Some examples of the method, apparatuses, and non-transitory computer-readable medium described herein may further include operations, features, means, or instructions for receiving, during the third slot, the acknowledgement information may be based on the first subcarrier spacing or the second subcarrier spacing, or both.

In some examples of the method, apparatuses, and non-transitory computer-readable medium described herein, the third slot includes a slot to receive the acknowledgement information associated with the first transmission and the second transmission.

Some examples of the method, apparatuses, and non-transitory computer-readable medium described herein may further include operations, features, means, or instructions for assigning an indicator of a set of indicator in the transmitted DCI message, the indicator including a time domain resource allocation field for both the first downlink data channel associated with the first component carrier and the second downlink data channel associated with the second component carrier, and where the third slot to use to receive the acknowledgement information may be based on the time domain resource allocation field.

Some examples of the method, apparatuses, and non-transitory computer-readable medium described herein may further include operations, features, means, or instructions for assigning a first indicator of a set of indicators in the received DCI message, the first indicator including a first time domain resource allocation field for the first downlink data channel associated with the first component carrier, assigning a second indicator of the set of indicators in the received DCI message, the second indicator including a second time domain resource allocation field for the second downlink data channel associated with the second component carrier, and where the third slot to use to receive the acknowledgement information may be based on the first and second time domain resource allocation fields.

In some examples of the method, apparatuses, and non-transitory computer-readable medium described herein, the acknowledgement information excludes feedback associated with the first downlink data channel or the second downlink data channel based on an absence of the timing offset in a set of timing offsets.

DETAILED DESCRIPTION

Figure 1:
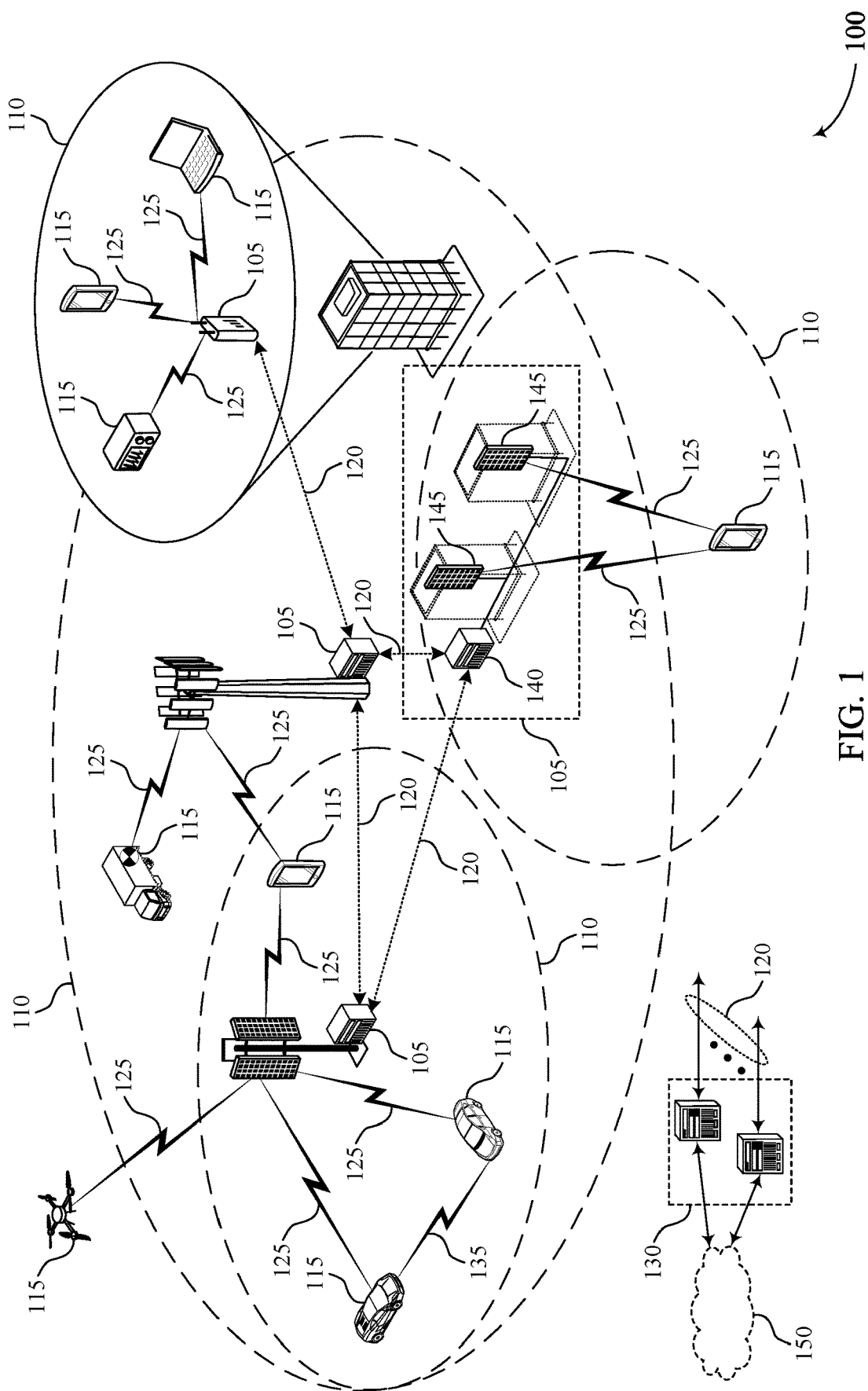
FIGS. 1 and 2 illustrate examples of wireless communications systems that support acknowledgement feedback for multi-component carrier scheduling in accordance with aspects of the present disclosure.

Wireless communications systems may include multiple communication devices such as user equipment (UEs) and base stations, which may provide wireless communication services to the UEs. For example, such base stations may be next-generation NodeBs or giga-NodeBs (either of which may be referred to as a gNB) that may support multiple radio access technologies including fourth generation (4G) systems, such as Long Term Evolution (LTE) systems, as well as fifth generation (5G) systems, which may be referred to as New Radio (NR) systems. The described techniques may be used to configure the UEs to support hybrid automatic repeat request (HARQ) feedback for multiple physical channels (e.g., multiple physical downlink shared channels (PDSCH)). In some examples, the described techniques may be used to configure the UEs to support HARQ feedback for multiple PDSCH scheduled via cross component carrier to improve reliability of various types of communication (e.g., data).

A base station may schedule multiple downlink data channels for a UE by transmitting control information in a downlink control information (DCI) message over a downlink control channel. A downlink data channel may include a PDSCH, while a downlink control channel may include a physical downlink control channel (PDCCH). The base station may thus schedule multiple PDSCH for the UE by transmitting DCI message over the PDCCH. Each PDSCH of the multiple PDSCH may carry a number of downlink data channel transmissions. In some examples of joint-scheduling, the DCI message may schedule a first PDSCH of a first component carrier and a second PDSCH of a second component carrier. The UE may receive and attempt to decode the first PDSCH and the second PDSCH, respectively.

In some examples, based on successfully or unsuccessfully decoding the first PDSCH and the second PDSCH, the UE may transmit feedback (e.g., a HARQ feedback) associated with the first PDSCH and the second PDSCH. The feedback may be an acknowledgement (ACK) or a non-acknowledgement (NACK) of the receipt of the scheduled PDSCHs and information associated with an ability of the UE to decode the first PDSCH and the second PDSCH. For each of the first PDSCH and the second PDSCH, the UE may transmit either an ACK (in the case that the UE successfully receives the data transmission) or a NACK (in the case that the UE unsuccessfully receives the data transmission). In some examples, the UE may transmit the feedback to the base station in one or more uplink control channels (or one or more resources associated with an uplink control channel), such as a physical uplink control channel (PUCCH).

The UE may determine a resource allocation for a PUCCH and one or more parameters for the feedback transmission based on a number of control fields or indicator fields included in the DCI message. In some examples, the feedback transmission for the multiple PDSCH may be carried on a same resource (e.g., PUCCH resources). Alternatively, the feedback transmission for the multiple PDSCH may be carried on different resources (e.g., PUCCH resources). The UE may determine the resource allocation for the PUCCH based on one or more values provided in the DCI message. In some examples, the DCI message may include one or more separate values (also referred to as fields or indicator fields) that convey information for providing HARQ feedback for the multiple scheduled PDSCH. For example, the base station may include one set of indicator fields in the DCI message that indicate a resource allocation for the UE to use for feedback transmissions associated with one PDSCH and a different set of indicator fields in the DCI message that indicate a resource allocation for the UE to use for feedback transmissions associated with another PDSCH. The UE may thus improve coverage for wireless communications by supporting HARQ feedback for multiple PDSCH scheduled via cross component carrier.

Particular aspects of the subject matter described in this disclosure may be implemented to realize one or more of the following potential advantages, among others. The techniques employed by the UE may provide benefits and enhancements to the operation of the UE. For example, operations performed by the UE may provide improvements to wireless communications, for example, when operating in 5G systems. In some examples, configuring the UE to support HARQ feedback for multiple PDSCH scheduled via cross component carrier, among other examples in 5G systems, may support improvements to power consumption, resource usage, coverage enhancement, spectral efficiency, higher data rates and, in some examples, may promote enhanced efficiency for wireless operations, among other benefits.

Aspects of the disclosure are initially described in the context of wireless communications systems. Aspects of the disclosure are further illustrated by and described with reference to block diagrams and process flows that HARQ feedback for multi-component carrier scheduling. Aspects of the disclosure are further illustrated by and described with reference to apparatus diagrams, system diagrams, and flowcharts that relate to providing HARQ feedback for multi-component carrier scheduling.

FIG. 1 illustrates an example of a wireless communications system 100 that supports acknowledgement feedback for multi-component carrier scheduling in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links. One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs. The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$, may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers. In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A base station 105 may transmit a DCI message in a PDCCH to a UE 115 to schedule multiple physical channels (e.g., multiple PDSCHs) between the base station 105 and the UE 115. In some examples, the base station 105 may schedule the multiple physical channels over multiple component carriers. For example, the base station 105 may schedule the multiple physical channels on multiple cells, where each cell is associated with a component carrier. Accordingly, the UE 115 may receive the DCI message and monitor the multiple component carriers for the multiple scheduled physical channels. In some examples, the UE 115 may transmit feedback information (e.g., HARQ feedback) to the base station 105 based on receiving and decoding each of the multiple physical channels. In some implementations, the UE 115 may use resources associated with an uplink control channel (e.g., PUCCH resources) for the feedback transmissions and may determine which PUCCH resources to use for the feedback transmissions based on the DCI message received from the base station 105.

Figure 2:
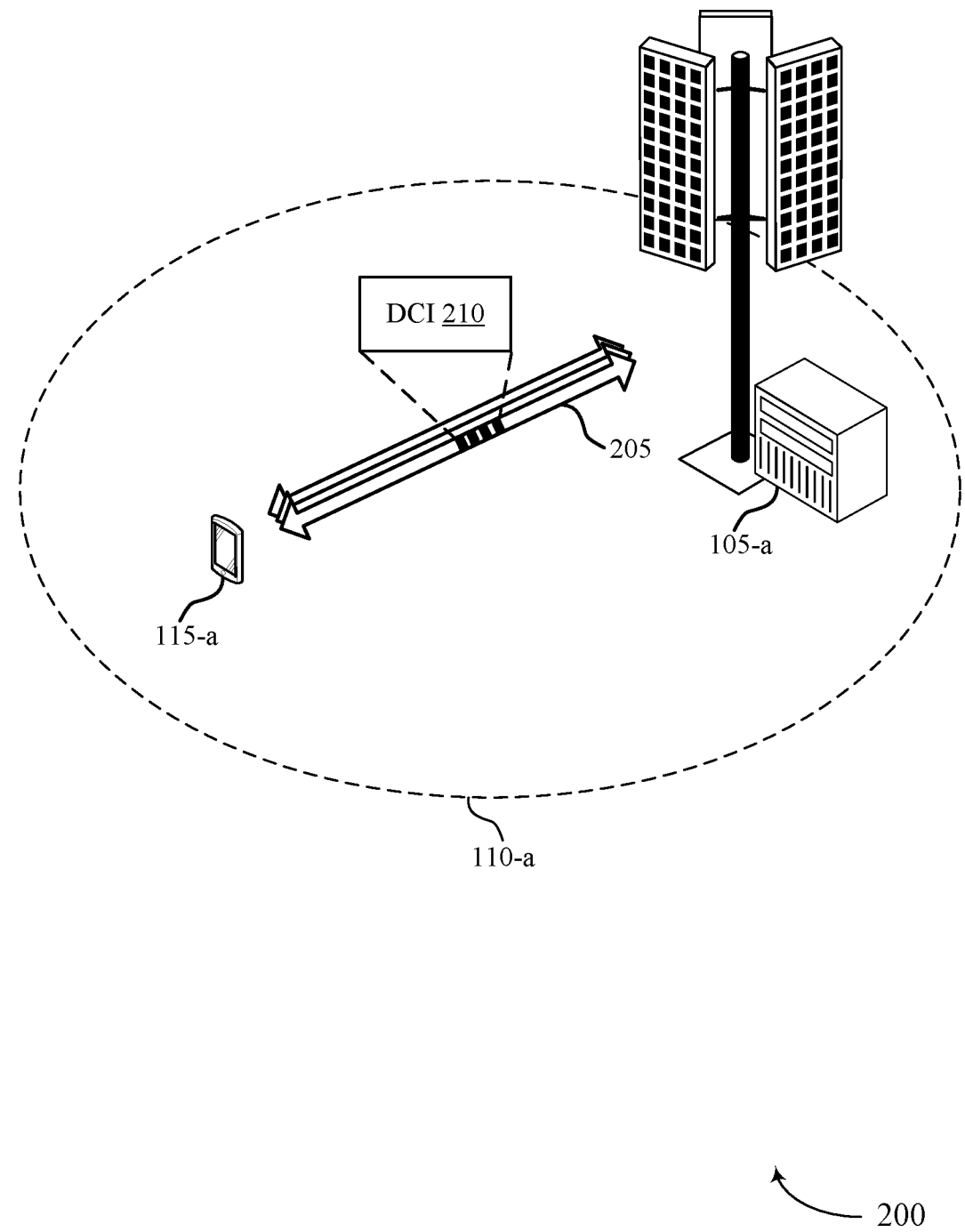

FIG. 2 illustrates an example of a wireless communications system 200 that supports acknowledgement feedback for multi-component carrier scheduling in accordance with aspects of the present disclosure. In some examples, the wireless communications system 200 may implement aspects of the wireless communications system 100. For example, the wireless communications system 200 may include a base station 105-a and a UE 115-a within a geographic coverage area 110-a. The base station 105-a and the UE 115-a may be examples of the corresponding devices described with reference to FIG. 1. In some examples, the wireless communications system 200 may support multiple radio access technologies including 4G systems such as LTE systems, LTE-A systems, or LTE-A Pro systems, and 5G systems which may be referred to as NR systems. The wireless communications system 200 may support improvements to power consumption and, in some examples, may promote enhanced efficiency for high reliability and low latency wireless communication operations, among other benefits.

The base station 105-*a* and the UE 115-*a* may be configured with multiple antennas, which may be used to employ techniques such as transmit diversity, receive diversity, multiple-input multiple-output communications, or beamforming, or any combination thereof. The antennas of the base station 105-*a* and the UE 115-*a* may be located within one or more antenna arrays or antenna panels, which may support multiple-input multiple-output operations or transmit or receive beamforming. For example, the base station 105 antennas or antenna arrays may be co-located at an antenna assembly, such as an antenna tower. In some examples, antennas or antenna arrays associated with the base station 105-*a* may be located in diverse geographic locations. The base station 105-*a* may have an antenna array with a number of rows and columns of antenna ports that the base station 105-*a* may use to support beamforming of communications with the UE 115-*a*. Likewise, the UE 115-*a* may have one or more antenna arrays that may support various multiple-input multiple-output or beamforming operations. Additionally or alternatively, an antenna panel may support radio frequency beamforming for a signal transmitted via one or more antenna ports. The base station 105-*a* and the UE 115-*a* may thus be configured to support directional communications 205 using the multiple antennas.

In some examples, the base station 105-*a* and the UE 115-*a* may communicate via the directional communications 205 using multiple component carriers. For example, the base station 105-*a* and the UE 115-*a* may be configured to support multiple downlink component carriers and multiple uplink component carriers. A component carrier may be associated with a carrier bandwidth of a radio frequency spectrum, and in some examples, the carrier bandwidth may be referred to as a system bandwidth of the carrier or the wireless communications system 200. For example, the carrier bandwidth may be one of a number of determined bandwidths for carriers of a particular radio access technology (e.g., 1.4, 3, 5, 10, 15, 20, 40, or 80 megahertz (MHz)). The base station 105-*a* and the UE 115-*a* may be configured to support the directional communications 205 over a carrier bandwidth or may be configured to support the directional communications 205 over one of multiple carrier bandwidths. In some examples, the base station 105-*a* or the UE 115-*a* may support simultaneous communications via carriers associated with multiple carrier bandwidths.

The UE 115-*a*, in the wireless communications system 200, may support operations to preserve resources (for example, time and frequency resources of the wireless communications system 200), a battery life of the UE 115-*a*, among other examples. In some examples, the UE 115-*a* may be configured to support operations to manage or improve the directional communications 205 between the base station 105-*a* and the UE 115-*a*. For example, the base station 105-*a* may configure the UE 115-*a* to support cross component carrier scheduling for some physical channels, such as PDSCH to improve efficiency and reliability of the directional communications 205.

The base station 105-*a* may transmit, and the UE 115-*a* may receive, control information, for example, DCI message 210 that may schedule physical channels (e.g., PDSCH) across multiple component carriers. In some examples, the base station 105-*a* and the UE 115-*a* may support cross component carrier scheduling to balance a load (e.g., traffic) and scheduling across different component carriers associated with the UE 115-*a*. By supporting cross component carrier scheduling, the UE 115-*a* may receive some physical channels (e.g., PDSCH) on a component carrier other than, or in addition to, the one on which other physical channels (e.g., PDCCH) carrying the DCI message 210 was received on. Examples of cross component carrier scheduling for multiple physical channels is described with reference to FIG. 3.

Figure 3:
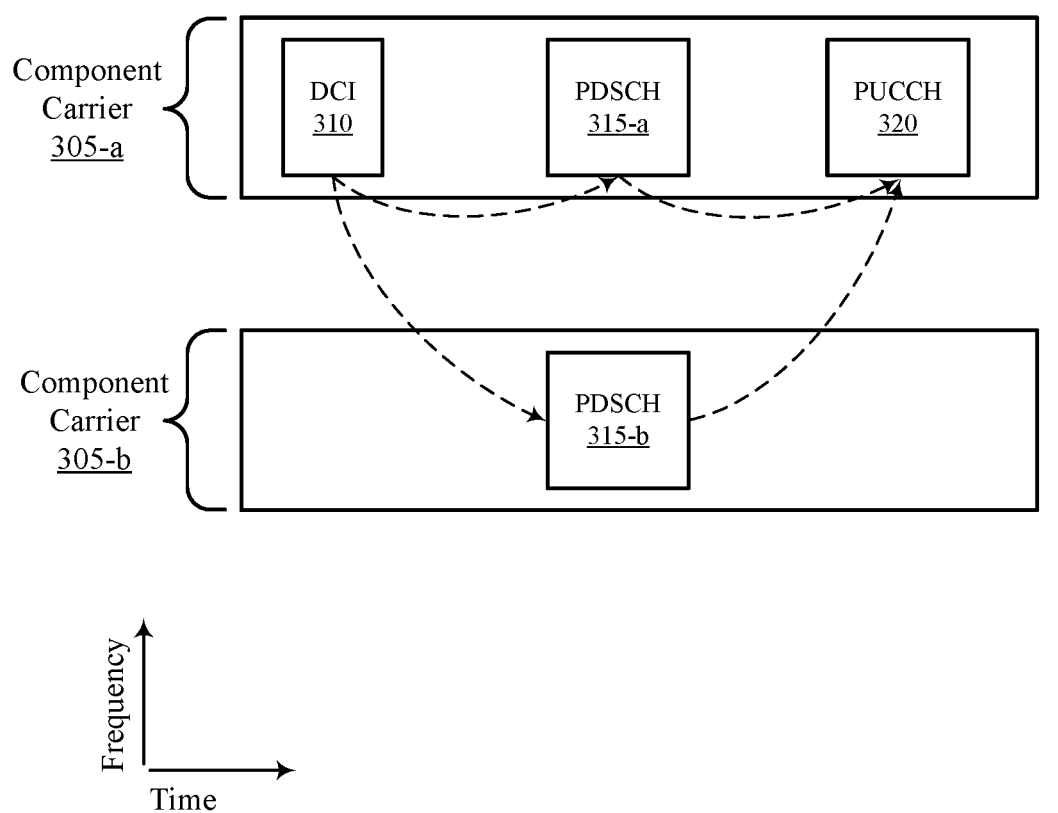
FIGS. 3 through 8 illustrate examples of block diagrams that support acknowledgement feedback for multi-component carrier scheduling in accordance with aspects of the present disclosure.

FIG. 3 illustrates an example of a block diagram 300 that supports acknowledgement feedback for multi-component carrier scheduling in accordance with aspects of the present disclosure. The block diagram 300 may implement aspects of the wireless communications systems 100 and 200 described with reference to FIGS. 1 and 2, respectively. For example, the block diagram 300 may be based on a configuration by a base station 105, and implemented by a UE 115. In the example illustrated in FIG. 3, the block diagram 300 may be applicable to implementations or instances when the UE 115 is configured to support NR dynamic spectrum sharing (DSS). DSS may allow different radio access technologies to share a bandwidth (e.g., radio frequency spectrum band). For example, DSS may allow deployment of both 4G and 5G in a same band and dynamically allocates spectrum resources between 4G and 5G based on user demand (e.g., data traffic). Additionally, in the example illustrated in FIG. 3, the block diagram 300 may be applicable to implementations or instances when the UE 115 is configured to provide HARQ feedback (e.g., a HARQ ACK, a HARQ NACK) for multiple physical channels (e.g., multiple PDSCH) scheduled via cross component carrier. Techniques described herein as applicable to or using HARQ or HARQ-ACK feedback may be applied to other types of acknowledgement feedback.

For example, a UE 115 may communicate with a base station 105 over multiple component carriers 305. The component carriers 305 may correspond to a system bandwidth, which may correspond to time resources (e.g., a symbol, a minislot, a slot, a subframe, a frame), as well as frequency resources (e.g., subcarriers, carriers). In some examples, the UE 115 may communicate with a primary cell, a primary secondary cell (e.g., a primary cell in a secondary cell group), or a secondary cell using a component carrier 305-*a* or a component carrier 305-*b*, or both. Examples of a primary cell, a primary secondary cell, or a secondary cell may be examples of a base station 105, as described with reference to FIGS. 1 and 2.

In the example of FIG. 3, a UE 115 may receive, from a base station 105, a DCI message 310 on the component carrier 305-*a*. For example, the UE 115 may receive a PDCCH carrying the DCI message 310 on the component carrier 305-*a*. The PDCCH may, in some examples, be associated with a secondary cell scheduling PDSCH or PUSCH on a primary cell or a primary secondary cell. For example, the DCI message 310 may schedule both a PDSCH 315-*a* associated with the component carrier 305-*a* and a PDSCH 315-*b* associated with the component carrier 305-*b*. In some other examples, the PDCCH may be associated with a primary cell, a primary secondary cell, or a secondary cell and may schedule PDSCH or PUSCH on multiple cells (e.g., multiple component carriers 305) using a single DCI message. In some cases, a number of cells (e.g., a number of component carriers) may be preconfigured (e.g., two cells).

In some examples, in addition to scheduling the PDSCH 315-*a* associated with the component carrier 305-*a* and the PDSCH 315-*b* associated with the component carrier 305-*b*, the DCI message 310 may schedule a PUCCH 320. The UE 115 may be configured to provide HARQ feedback (e.g., a HARQ ACK, a HARQ NACK) for the PDSCH 315-a or the PDSCH 315-b, or both, via the PUCCH 320. In other words, the PUCCH 320 may carry HARQ feedback for the PDSCH 315-a or the PDSCH 315-b, or both.

Thus, a base station 105 may transmit, to a UE 115, a DCI message that jointly schedules multiple PDSCH across multiple component carriers, as well as a PUCCH for the UE 115 to provide HARQ feedback for the joint scheduled PDSCH on at least one component carrier of the multiple component carriers, as well as a PUCCH for the UE 115 to provide feedback for the jointly scheduled PDSCH on at least one component carrier of the multiple component carriers. In some examples, the UE 115 may determine the PUCCH (and PUCCH resources associated with the PUCCH) based on identifying a number of fields in the DCI message 310. As described herein, to support system flexibility the DCI message 310 may include various indicator fields to indicate PUCCH resources for the HARQ feedback for the joint scheduled PDSCH.

Returning to FIG. 2, as demand for communication efficiency increases, some wireless communications systems, such as 4G and 5G systems, may be unable to support efficient HARQ feedback for multiple physical channels (e.g., multiple PDSCH) scheduled via cross component carrier scheduling, among other examples. Various aspects of the described techniques relate to configuring the UE 115-a to provide HARQ feedback for multiple physical channels (e.g., multiple PDSCH) scheduled via cross component carrier, in the wireless communications system 200. For example, the base station 105-a may provide the UE 115-a with a HARQ feedback timing, which may indicate resources for a HARQ feedback for multiple PDSCH. The resources may include time resources (e.g., a symbol, a minislot, a slot, a subframe, a frame), as well as frequency resources (e.g., subcarriers, carriers). In some examples, the base station 105-a may provide the HARQ feedback timing semi-statically (e.g., via an RRC message or a MAC-CE). In some other examples, the base station 105-a may provide the HARQ feedback timing dynamically (e.g., via DCI message).

By way of example, the base station 105-a may transmit, and the UE 115-a may receive, the DCI message 210. In some examples, the base station 105-a may transmit, and the UE 115-a may receive, multiple DCI messages including the DCI message 210. The DCI message 210 may schedule multiple PDSCH across multiple component carriers. In some examples, the UE 115-a may be configured to handle HARQ feedback for the multiple scheduled PDSCH. The UE 115-a may, for example, determine resources (also referred to as PUCCH resource) of a PUCCH for providing HARQ feedback for the multiple scheduled PDSCH based on one or more values provided in the DCI message 210. In some examples, the DCI message 210 may include one or more separate values (also referred to as fields or indicator fields) that convey information for providing HARQ feedback for the multiple scheduled PDSCH. For example, the DCI message 210 may include a feedback timing indicator field (e.g., a PDSCH-to-HARQ feedback timing indicator field ($K_1$)), a resource indicator field (e.g., a PUCCH resource indicator (PRI) field), a transmit power control (TPC) indicator field, or a downlink assignment index (DAI) field, among other examples. In some other examples, the DCI message 210 may include a composite value that conveys information for providing HARQ feedback for the multiple scheduled PDSCH (e.g., a pattern or bitmap, a value that maps to an RRC configuration for providing HARQ feedback for the multiple scheduled PDSCH, etc.).

The UE 115-a may be configured to determine resources of a PUCCH for providing HARQ feedback for the multiple scheduled PDSCH based in part on the feedback timing indicator field. The feedback timing indicator field may be a timing value (also referred to as a timing offset) in resources (e.g., a symbol, a minislot, a slot, a subframe, a frame) between reception of a PDSCH (e.g., reception of a PDSCH transmission) and transmission of a corresponding PUCCH (e.g., transmission of HARQ feedback on the PUCCH). In some examples, the UE 115-a may interpret the feedback timing indicator field depending on one or more factors, for example, such as other values (e.g., other fields) in the DCI message 210. Examples of cross component carrier scheduling for multiple physical channels, and feedback timing interpretation is described with reference to FIG. 4.

Figure 4:
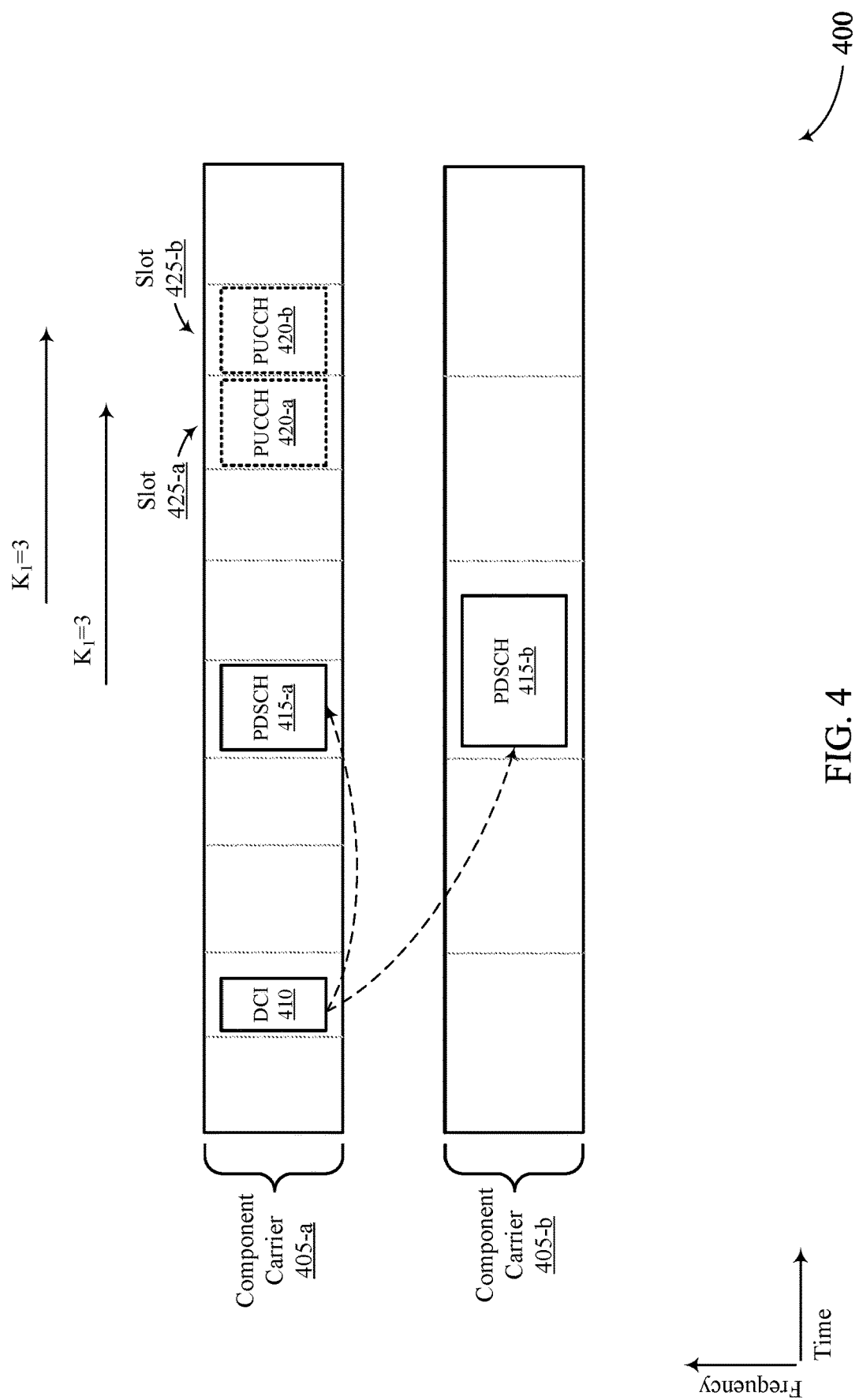

FIG. 4 illustrates an example of a block diagram 400 that supports acknowledgement feedback for multi-component carrier scheduling in accordance with aspects of the present disclosure. The block diagram 400 may implement aspects of the wireless communications systems 100 and 200 described with reference to FIGS. 1 and 2, respectively. For example, the block diagram 400 may be based on a configuration by a base station 105, and implemented by a UE 115. In the example illustrated in FIG. 4, the block diagram 400 may be applicable to implementations or instances when the UE 115 is configured to support NR DSS. Additionally, in the example illustrated in FIG. 4, the block diagram 400 may be applicable to implementations or instances when the UE 115 is configured to provide HARQ feedback (e.g., a HARQ ACK, a HARQ NACK) for multiple physical channels (e.g., multiple PDSCH) scheduled via cross component carrier.

For example, a UE 115 may communicate with a base station 105 over multiple component carriers 405. The component carriers 405 may correspond to a system bandwidth, which may correspond to time resources (e.g., a symbol, a minislot, a slot, a subframe, a frame), as well as frequency resources (e.g., subcarriers, carriers). In some examples, the component carriers 405 may have a specific subcarrier spacing. For example, a component carrier 405-a may have a subcarrier spacing of 30 kHz and a component carrier 405-b may have a subcarrier spacing of 15 kHz. Other subcarriers spacings may be applicable to implementations or instances when the UE 115 is configured to support NR DSS. In some examples, the UE 115 may communicate with a primary cell, a primary secondary cell, or a secondary cell using the component carrier 405-a or the component carrier 405-b, or both. Examples of a primary cell, a primary secondary cell, or a secondary cell may be examples of a base station 105, as described with reference to FIGS. 1 and 2.

In the example of FIG. 4, a UE 115 may receive, from a base station 105, a DCI message 410 on the component carrier 405-a. For example, the UE 115 may receive a PDCCH carrying the DCI message 410 on the component carrier 405-a. The DCI message 410 may schedule both a PDSCH 415-a associated with the component carrier 405-a and a PDSCH 415-b associated with the component carrier 405-b. In some examples, the DCI message 410 may include one or more separate values (also referred to as fields) that convey information for providing HARQ feedback for the multiple scheduled PDSCH. For example, the DCI message 410 may include a feedback timing indicator field (e.g., a $K_1$), a PRI field, a TPC indicator field, or a DAI field, among other indicator fields.

In some examples, in addition to scheduling the PDSCH 415-a associated with the component carrier 405-a and the PDSCH 415-b associated with the component carrier 405-b, the DCI message 410 may schedule a PUCCH 420. The UE 115 may be configured to provide HARQ feedback (e.g., a HARQ ACK, a HARQ NACK) for the PDSCH 415-a or the PDSCH 415-b, or both, via the PUCCH 420. The UE 115 may be configured to determine resources of the PUCCH 420 for providing HARQ feedback for the multiple scheduled PDSCH 415 based in part on the feedback timing indicator field. The feedback timing indicator field may be a timing offset (e.g., a symbol, a minislot, a slot, a subframe, a frame) between reception of a PDSCH 415 (e.g., reception of a PDSCH transmission) and transmission of the PUCCH 420 (e.g., transmission of HARQ feedback on the PUCCH 420). In other words, the feedback timing indicator field may define a timing offset between a PDSCH reception and a PUCCH transmission that carries HARQ feedback for the PDSCH reception.

The UE 115 may interpret the feedback timing indicator field depending on one or more factors, for example, such as other values (e.g., other fields) in the DCI message 410. In some examples, the UE 115 may interpret the feedback timing indicator field to count from a symbol, a minislot, a slot, a subframe, or a frame, associated with an ending of a PDSCH 415. In some examples, the UE 115 may interpret the feedback timing indicator field to count from a symbol, a minislot, a slot, a subframe, or a frame, associated with an ending of a PDSCH 415 based on a numerology associated with a component carrier 405 carrying the PUCCH 420. The numerology may correspond to a subcarrier spacing of a component carrier 405.

In the example illustrated in FIG. 4, the PDSCH 415-a and the PDSCH 415-b may end in a different symbol, minislot, slot, subframe, or frame. As such, based on the interpretation of the feedback timing indicator field, the UE 115 may determine either to transmit a PUCCH 420-a during a slot 425-a or a PUCCH 420-b during a slot 425-b. In some examples, the interpretation of the feedback timing indicator field by the UE 115 may be based in part on one or more other values (e.g., fields) in the DCI message 410. For example, the interpretation of the feedback timing indicator field by the UE 115 may be based in part on a resource allocation indicator field (e.g. a PDSCH-TimeDomainResourceAllocation (TDRA) indicator field). The resource allocation indicator field may indicate a timing offset (e.g., $K_0$) and a start and length indicator (SLIV), or directly a beginning symbol (e.g., 5) and an allocation length (e.g., L) from the DCI message 410 to the PDSCH 415-a or the PDSCH 415-b, or both.

In some examples, the DCI message 410 may carry separate indications for timing offsets between the DCI and PDSCH 415-a or the PDSCH 415-b (e.g., $K_0$). For example, the DCI message 410 may include separate time-domain resource allocation indicator fields (e.g., TDRA indicator fields). Alternatively, the resource allocation indicator field may point to a single joint row of a resource allocation table, and may indicate multiple values for the timing offset (e.g., $K_0$) and multiple values for the SLIV. For example, a single resource row may indicate both a timing offset (e.g., $K_0$) and SLIV for the PDSCH 415-a and a timing offset (e.g., $K_0$) and SLIV for the PDSCH 415-b. In some other examples, the DCI message 410 may carry a single indication for a timing offset (e.g., $K_0$), but different subcarrier spacings. For example, a single timing offset (e.g., $K_0=2$) may be assigned to both the PDSCH 415-a and the PDSCH 415-b, which may be in different slots with respect to a numerology associated with the PUCCH 420. In other examples, the UE 115 may be configured to interpret a value of a timing offset (e.g., $K_0$) indicated in the DCI message 410 differently based on a subcarrier spacing of the component carriers 405 for each PDSCH 415. The PDSCH 415 may begin in a same symbol, minislot, slot, subframe, or frame, but depending on a beginning symbol (e.g., 5) and an allocation length (e.g., L) associated with the PDSCH 415, the PDSCH 415 may end in different symbols, minislots, slots, subframes, or frames.

In some examples, the base station 105 may configure the UE 115 with one or more rules (e.g., configurations) to determine a symbol, a minislot, a slot, a subframe, or a frame that carries HARQ feedback for the multiple PDSCH 415. In some examples, the base station 105 may configure the UE 115 to determine a reference symbol, minislot, slot, subframe, or frame for counting a timing offset (e.g., $K_1$) from a latest symbol, minislot, slot, subframe, or frame (or an earliest symbol, minislot, slot, subframe, or frame) among the two where the multiple PDSCH 415 end. The UE 115 may therefore determine whether to transmit the PUCCH 420-a during the slot 425-a or the PUCCH 420-b during the slot 425-b based on the determined reference. Thus, a base station 105 may transmit, to a UE 115, a DCI message that jointly schedules multiple PDSCH across multiple component carriers, as well as a PUCCH for the UE 115 to provide HARQ feedback for the joint scheduled PDSCH on at least one component carrier of the multiple component carriers, and one or more rules for determining resources (e.g., a slot) for the HARQ feedback.

In some examples, the UE 115 may determine that a PDSCH whose timing for HARQ feedback (e.g., ACK/NACK) is not explicitly indicated. For example, the UE 115 may not receive a timing value (e.g., $K_1$) for the PDSCH 415-a, but may receive a timing value (e.g., $K_1$) for the PDSCH 415-b in the DCI message 410. In some examples, the timing value (e.g., $K_1$) for the PDSCH 415-b may not belong to a set of configured timing values (e.g., $K_1=4$ does not belong to dl-DataToUL-ACK (e.g., dl-DataToUL-ACK={1,2,3})). In this case, the UE 115 may not report HARQ feedback (e.g., ACK/NACK) for that PDSCH 415-a. In other words, the UE 115 does not report an ACK/NACK for the PDSCH 415-a and only reports ACK/NACK for the PDSCH 415-b. In some examples, the base station 105 may be responsible that both scheduled PDSCHs are included in the set of slot timing values (e.g., $K_1$).

Returning to FIG. 2, in some examples of the wireless communications system 200, the base station 105-a may configure the UE 115-a to generate a codebook (e.g., a HARQ-ACK codebook) for providing a HARQ feedback for multiple scheduled PDSCH. In some examples, the base station 105-a may configure the UE 115-a to generate a first codebook type (e.g., a Type-1 codebook, or semi-static codebook type) or to generate a second codebook (e.g., a Type-2 codebook or dynamic codebook type, or both, for providing a HARQ feedback). The UE 115-a may thus generate a codebook for multiple PDSCH on multiple component carriers, and transmit a HARQ feedback for the PDSCH based on the generated codebook. In some examples, a codebook may be arranged according to PDSCH occasion and cell (e.g., primary cell, secondary cell). The codebook may thus include a number of HARQ feedback bits to be reported for each PDSCH.

By way of example, the base station 105-a may configure the UE 115-a, via an RRC configuration (e.g., pdsch-HARQ-ACK-Codebook=semi-static), to support a Type-1 codebook. For a serving cell (e.g., the base station 105-a), the UE 115-a may determine a number of PDSCH occasions for candidate PDSCH receptions for which the UE 115-a may transmit a HARQ feedback in a PUCCH during a symbol, a minislot, a slot, a subframe, or a frame. The UE 115-a may be configured to generate the Type-1 codebook based in part on the number of PDSCH occasions. In some examples, the UE 115-a may be configured to determine the number of PDSCH occasions per downlink serving cell.

In some examples, the UE 115-a may be configured to determine the number of PDSCH occasions based on a set of timing values (e.g., $K_1$), which may be associated with an uplink bandwidth part. In some examples, if the UE 115-a is configured to monitor a PDCCH for a first control format (e.g., a DCI format 1_0) and the UE 115-a is not configured to monitor the PDCCH for a second control format (e.g., a DCI format 1_1) on the serving cell (e.g., the base station 105-a), the set of timing values associated with the first control format may be correspond to a first set of timing values (e.g., {1, 2, 3, 4, 5, 6, 7, 8}). Alternatively, if the UE 115-a is configured to monitor the PDCCH for the second control format (e.g., a DCI format 1_1) on the serving cell (e.g., the base station 105-a), the set of timing values associated with the second control format may be correspond to a second set of timing values provided by a higher layer parameter (e.g., dl-DataToUL-ACK) in an RRC configuration message field (e.g., PUCCH-Config).

The UE 115-a may determine a set of PDSCH TDRA candidates within a symbol, a minislot, a slot, a subframe, or a frame. In some examples, the UE 115-a may be configured determine the set of PDSCH TDRA candidates by mapping to a configured TDRA table or a default TDRA table for the multiple component carriers. In some examples, the UE 115-a may determine a maximum candidate PDSCH occasion per slot per downlink component carrier. In some examples, the number of candidate PDSCH occasions per slot per downlink component carrier may be more than one depending on the TDRA table configured for the downlink component carrier. In some examples, the UE 115-a may determine a transport block size based on HARQ feedback and a maximum number of codewords per PDSCH. Additionally or alternatively, the UE 115-a may be configured determine the set of PDSCH TDRA candidates based in part on a TDD uplink/downlink configuration. Examples of a semi-static codebook is described with reference to FIGS. 5 and 6.

Figure 5:
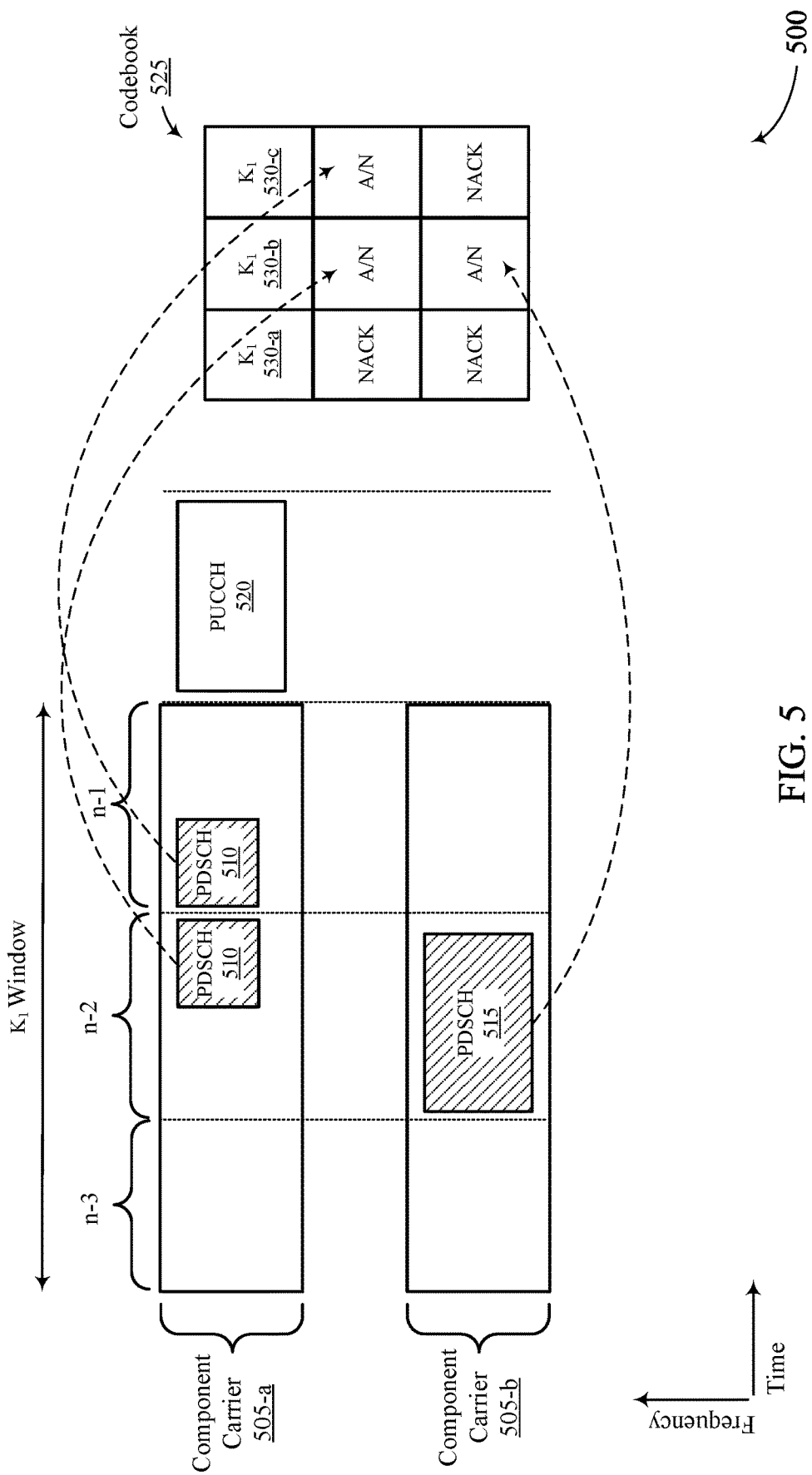

FIG. 5 illustrates an example of a block diagram 500 that supports acknowledgement feedback for multi-component carrier scheduling in accordance with aspects of the present disclosure. The block diagram 500 may implement aspects of the wireless communications systems 100 and 200 described with reference to FIGS. 1 and 2, respectively. For example, the block diagram 500 may be based on a configuration by a base station 105, and implemented by a UE 115. In the example illustrated in FIG. 5, the block diagram 500 may be applicable to implementations or instances when the UE 115 is configured to support NR DSS. Additionally, in the example illustrated in FIG. 5, the block diagram 500 may be applicable to implementations or instances when the UE 115 is configured to provide HARQ feedback (e.g., a HARQ ACK, a HARQ NACK) for multiple physical channels (e.g., multiple PDSCH) scheduled via cross component carrier.

For example, a UE 115 may communicate with a base station 105 over multiple component carriers 505. The component carriers 505 may correspond to a system bandwidth, which may correspond to time resources (e.g., a symbol, a minislot, a slot, a subframe, a frame), as well as frequency resources (e.g., subcarriers, carriers). In some examples, the component carriers 505 may have a same subcarrier spacing. In some examples, the UE 115 may communicate with a primary cell, a primary secondary cell, or a secondary cell using a component carrier 505-a or a component carrier 505-b, or both. Examples of a primary cell, a primary secondary cell, or a secondary cell may be examples of a base station 105, as described with reference to FIGS. 1 and 2.

In the example of FIG. 5, a UE 115 may receive, from a base station 105, a DCI message scheduling both PDSCH 510 associated with the component carrier 505-a and PDSCH 515 associated with the component carrier 505-b. In some examples, the DCI message may include one or more separate values (also referred to as fields) that convey information for providing HARQ feedback for the multiple scheduled PDSCH. For example, the DCI message may include a feedback timing indicator field (e.g., $K_1$), a PRI field, a TPC indicator field, or a DAI field, among other indicator fields. In some examples, in addition to scheduling the PDSCH 510 associated with the component carrier 505-a and the PDSCH 515 associated with the component carrier 505-b, the DCI message may schedule a PUCCH 520.

The UE 115 may be configured to provide HARQ feedback (e.g., a HARQ ACK, a HARQ NACK) for the PDSCH 510 or the PDSCH 515, or both, via the PUCCH 520. In some examples, the UE 115 may generate a codebook 525 based in part on the feedback timing indicator field (e.g., $K_1$). The codebook 525 may include rows and columns, where each row and column correspond to feedback timing indicator fields 530-a through 530-c and a HARQ feedback (e.g., NACK, ACK/NACK (A/N)). In the codebook 525, the UE 115 may insert an actual ACK/NACK for a PDSCH occasion if the UE 115 receives a DCI message that indicates to the UE 115 to feedback ACK/NACK for the PDSCH (e.g., in the PUCCH slot n). Otherwise, the UE 115 may generate a NACK. For example, if a DCI message is missed, the UE 115 may transmit a NACK.

The UE 115 may determine a number of HARQ feedback bits to be reported for each PDSCH. For example, the UE 115 may determine a number of HARQ feedback bits (e.g., 3 bits) to be reported for PDSCH 510 and a number of HARQ feedback bits (e.g., 3 bits) to be reported for PDSCH 515. The UE 115 may thus determine a number of HARQ feedback bits for multiple PDSCH on multiple component carriers, and transmit a HARQ feedback for the PDSCH.

Figure 6:
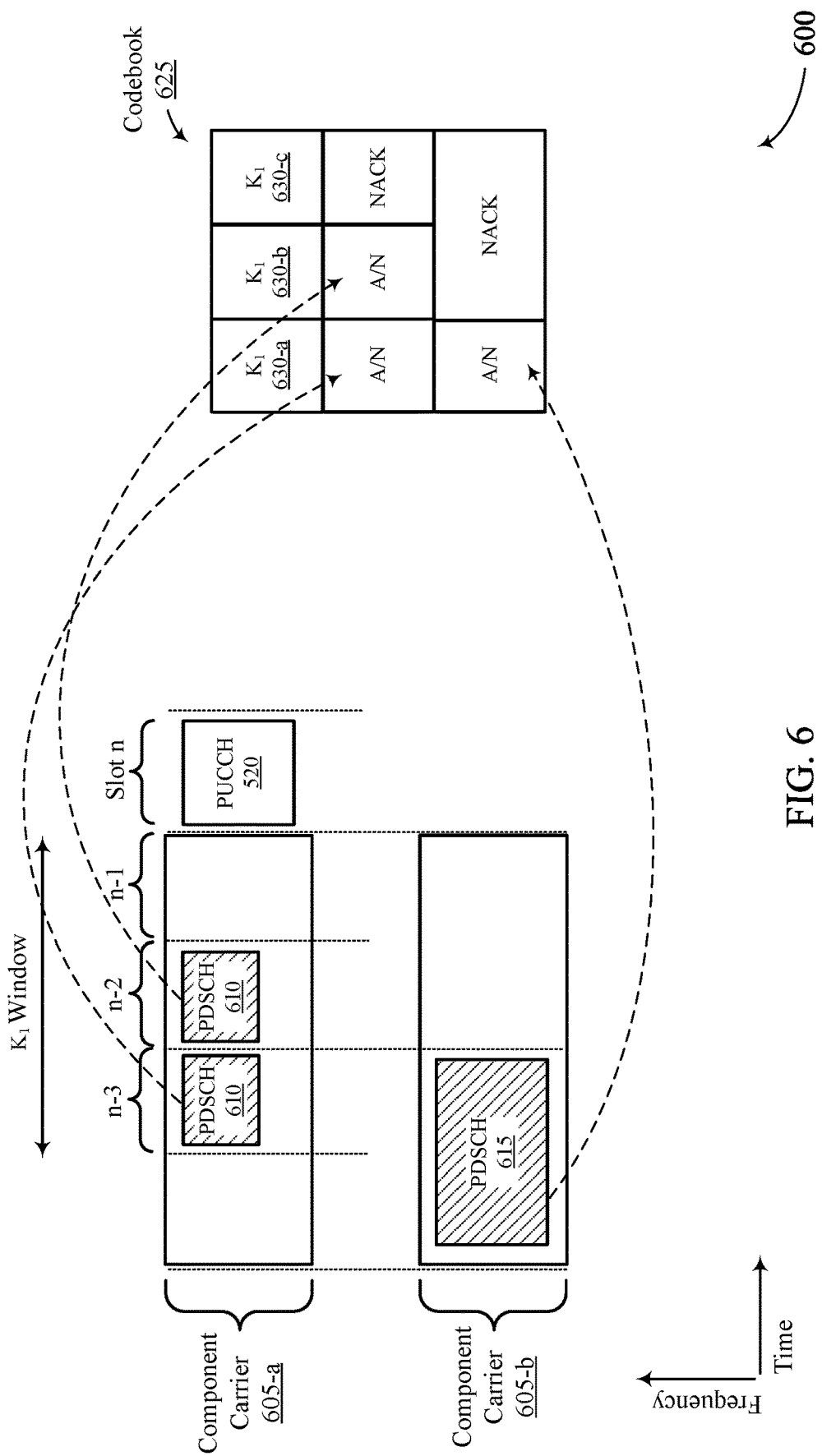

FIG. 6 illustrates an example of a block diagram 600 that supports acknowledgement feedback for multi-component carrier scheduling in accordance with aspects of the present disclosure. The block diagram 600 may implement aspects of the wireless communications systems 100 and 200 described with reference to FIGS. 1 and 2, respectively. For example, the block diagram 600 may be based on a configuration by a base station 105, and implemented by a UE 115. In the example illustrated in FIG. 6, the block diagram 600 may be applicable to implementations or instances when the UE 115 is configured to support NR DSS. Additionally, in the example illustrated in FIG. 6, the block diagram 600 may be applicable to implementations or instances when the UE 115 is configured to provide HARQ feedback (e.g., a HARQ ACK, a HARQ NACK) for multiple physical channels (e.g., multiple PDSCH) scheduled via cross component carrier.

For example, a UE 115 may communicate with a base station 105 over multiple component carriers 605. The component carriers 605 may correspond to a system bandwidth, which may correspond to time resources (e.g., a symbol, a minislot, a slot, a subframe, a frame), as well as frequency resources (e.g., subcarriers, carriers). In some examples, the component carriers 605 may have different subcarrier spacings, as described herein. In some examples, the UE 115 may communicate with a primary cell, a primary secondary cell, or a secondary cell using a component carrier 605-*a* or a component carrier 605-*b*, or both. Examples of a primary cell, a primary secondary cell, or a secondary cell may be examples of a base station 105, as described with reference to FIGS. 1 and 2.

In the example of FIG. 6, a UE 115 may receive, from a base station 105, a DCI message scheduling both PDSCH 610 associated with the component carrier 605-*a* and PDSCH 615 associated with the component carrier 605-*b*. In some examples, the DCI message may include one or more separate values (also referred to as fields) that convey information for providing HARQ feedback for the multiple scheduled PDSCH. For example, the DCI may include a feedback timing indicator field (e.g., $K_1$), a PRI field, a TPC indicator field, or a DAI field, among other indicator fields. In some examples, in addition to scheduling the PDSCH 610 associated with the component carrier 605-*a* and the PDSCH 615 associated with the component carrier 605-*b*, the DCI message may schedule a PUCCH 620.

The UE 115 may be configured to provide HARQ feedback (e.g., a HARQ ACK, a HARQ NACK) for the PDSCH 610 or the PDSCH 615, or both, via the PUCCH 620. In some examples, the UE 115 may generate a codebook 625 based in part on the feedback timing indicator field (e.g., $K_1$). The codebook 625 may include rows and columns, where each row and column correspond to feedback timing indicator fields 630-*a* through 630-*c* and a HARQ feedback (e.g., NACK, ACK/NACK). The UE 115 may determine a number of HARQ feedback bits to be reported for each PDSCH. For example, the UE 115 may determine a number of HARQ feedback bits (e.g., 3 bits) to be reported for PDSCH 510 and a number of HARQ feedback bits (e.g., 2 bits) to be reported for PDSCH 615. The UE 115 may thus determine a number of HARQ feedback bits for multiple PDSCH on multiple component carriers, and transmit a HARQ feedback for the PDSCH.

Returning to FIG. 2, in some examples, the UE 115-*a* may determine resources of a PUCCH for providing HARQ feedback for the multiple scheduled PDSCH based on one or more values, which may include a PRI provided in the multiple DCI messages including the DCI message 210. For example, the UE 115-*a* may determine resources of a PUCCH for providing HARQ feedback for the multiple scheduled PDSCH based on a PRI in a last received DCI message (e.g., the DCI message 210). As such, the resource determination may be based on a PRI in a last DCI message, which may have a first control format (e.g., a DCI format 1_0) or a second control format (e.g., a DCI format 1_1). In some examples, among the multiple DCI messages including the DCI message 210 that have a value of a feedback indicator field (e.g., a PDSCH-to-HARQ_feedback timing indicator field) indicating a same slot for a PUCCH transmission, and for which the UE 115-*a* transmits corresponding HARQ feedback in a PUCCH, for the PUCCH resource determination, the UE 115-*a* may order the multiple DCI messages in an ascending order across serving cells indexes for a same PDCCH monitoring occasion and are then indexed in an ascending order across PDCCH monitoring occasion indexes.

Figure 7:
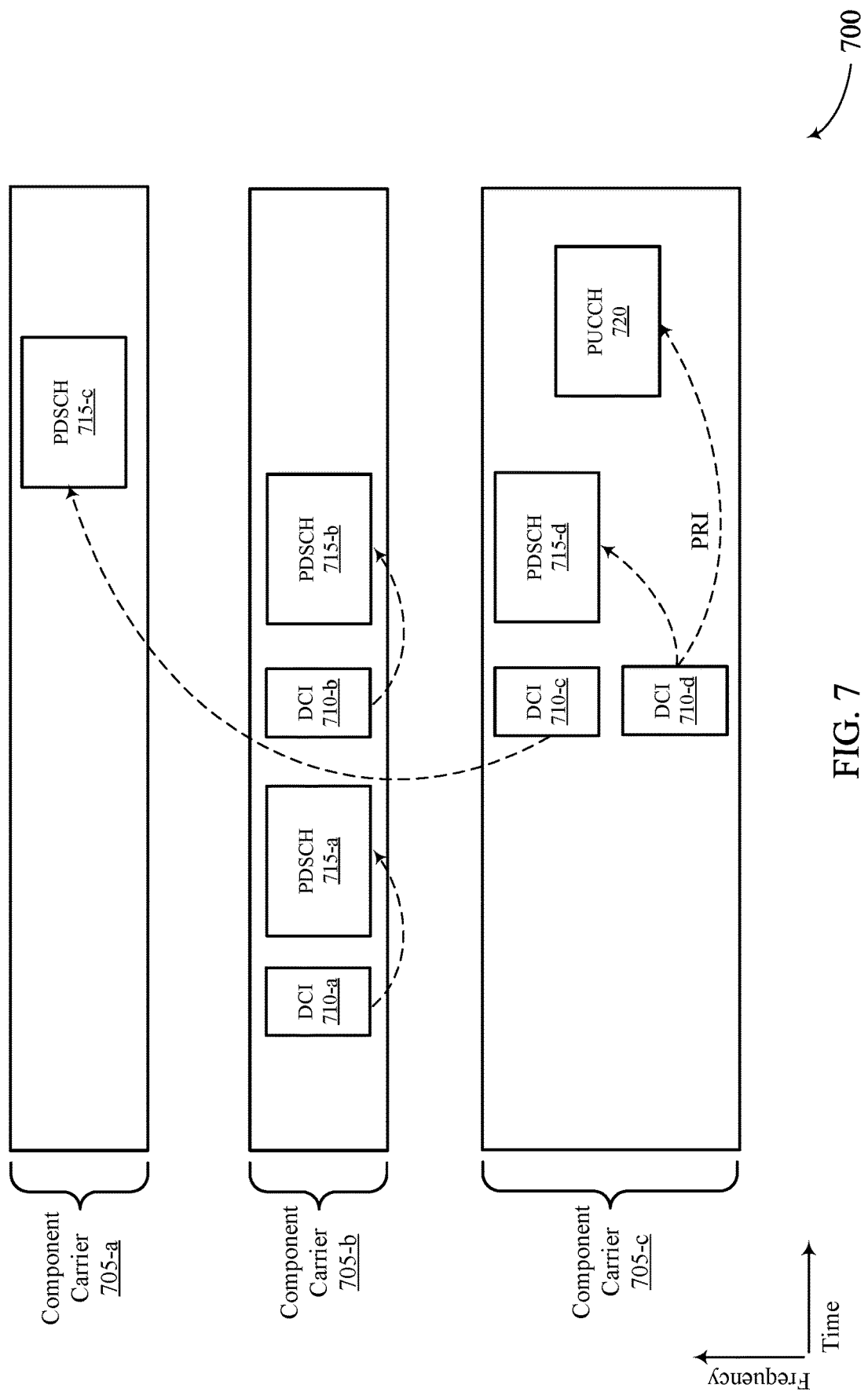

FIG. 7 illustrates an example of a block diagram 700 that supports acknowledgement feedback for multi-component carrier scheduling in accordance with aspects of the present disclosure. The block diagram 700 may implement aspects of the wireless communications systems 100 and 200 described with reference to FIGS. 1 and 2, respectively. For example, the block diagram 700 may be based on a configuration by a base station 105, and implemented by a UE 115. In the example illustrated in FIG. 7, the block diagram 700 may be applicable to implementations or instances when the UE 115 is configured to support NR DSS. Additionally, in the example illustrated in FIG. 7, the block diagram 700 may be applicable to implementations or instances when the UE 115 is configured to provide HARQ feedback (e.g., a HARQ ACK, a HARQ NACK) for multiple physical channels (e.g., multiple PDSCH) scheduled via cross component carrier.

For example, a UE 115 may communicate with a base station 105 over multiple component carriers 705. The component carriers 705 may correspond to a system bandwidth, which may correspond to time resources (e.g., a symbol, a minislot, a slot, a subframe, a frame), as well as frequency resources (e.g., subcarriers, carriers). In some examples, the UE 115 may communicate with a primary cell, a primary secondary cell, or a secondary cell using a component carrier 705-*a*, a component carrier 705-*b*, or a component carrier 705-*c*, or any combination thereof. Examples of a primary cell, a primary secondary cell, or a secondary cell may be examples of a base station 105, as described with reference to FIGS. 1 and 2.

In the example of FIG. 7, a UE 115 may receive, from a base station 105, a DCI message 710-*a* on the component carrier 705-*b*. The DCI message 710-*a* may schedule a PDSCH 715-*a*. In some examples, the UE 115 may receive, from the base station 105, a DCI message 710-*b* on the component carrier 705-*b*. The DCI message 710-*b* may schedule a PDSCH 715-*b*. In some other examples, the UE 115 may receive, from the base station 105, a DCI message 710-*c* on the component carrier 705-*c*. The DCI message 710-*c* may schedule a PDSCH 715-*c*. In other examples, the UE 115 may receive, from the base station 105, a DCI message 710-*d* on the component carrier 705-*c*. The DCI message 710-*d* may schedule both a PDSCH 715-*d* and a PUCCH 720. The UE 115 may be configured to provide HARQ feedback (e.g., a HARQ ACK, a HARQ NACK) for the PDSCH 715 via the PUCCH 720.

In some examples, the UE 115 may determine a resource (e.g., a PUCCH resource) associated with the PUCCH 720 based in part on a PRI associated with one or more of the DCI messages 710. For example, the UE 115 may determine resources of the PUCCH 720 for providing HARQ feedback for the multiple scheduled PDSCH 715 based on a PRI in a last received DCI message (e.g., the DCI message 710-*d*). As such, the resource determination may be based on a PRI in a last DCI message, which may have a first control format (e.g., a DCI format 1_0) or a second control format (e.g., a DCI format 1_1). In some examples, among the multiple DCI messages 710 that have a value of a feedback indicator field indicating a same slot for the PUCCH 720, and for which the UE 115 transmits corresponding HARQ feedback in the PUCCH 720, for the PUCCH resource determination, the UE 115 may order the multiple DCI messages 710 in an ascending order across serving cells indexes for a same PDCCH monitoring occasion and are then indexed in an ascending order across PDCCH monitoring occasion indexes. For example, the UE 115 may order the DCI messages 710 according to the following order the DCI message 710-*a*, the DCI message 710-*c*, the DCI message 710-*b*, and the DCI message 710-*d*.

As demand for communication efficiency increases, some wireless communications systems, such as 4G and 5G systems, may be unable to determine a last DCI message when one or more of the DCI messages 710 schedule multiple cells. Additionally, some wireless communications systems, such as 4G and 5G systems, may be unable to order multiple DCI messages in a last PDCCH monitoring occasion.

Figure 8:
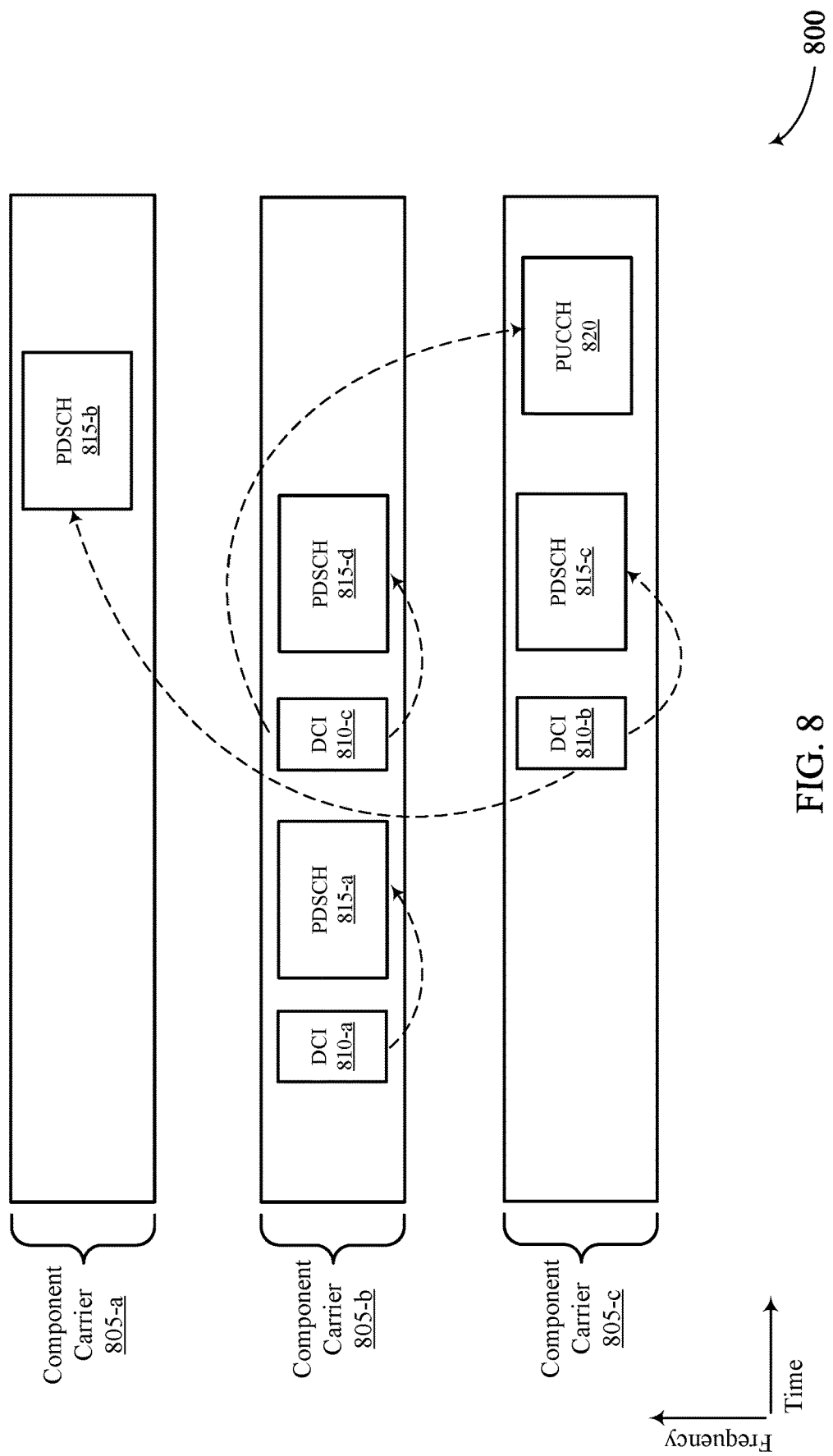

FIG. 8 illustrates an example of a block diagram 800 that supports acknowledgement feedback for multi-component carrier scheduling in accordance with aspects of the present disclosure. The block diagram 800 may implement aspects of the wireless communications systems 100 and 200 described with reference to FIGS. 1 and 2, respectively. For example, the block diagram 800 may be based on a configuration by a base station 105, and implemented by a UE 115. In the example illustrated in FIG. 8, the block diagram 800 may be applicable to implementations or instances when the UE 115 is configured to support NR DSS. Additionally, in the example illustrated in FIG. 8, the block diagram 800 may be applicable to implementations or instances when the UE 115 is configured to provide HARQ feedback (e.g., a HARQ ACK, a HARQ NACK) for multiple physical channels (e.g., multiple PDSCH) scheduled via cross component carrier.

For example, a UE 115 may communicate with a base station 105 over multiple component carriers 805. The component carriers 805 may correspond to a system bandwidth, which may correspond to time resources (e.g., a symbol, a minislot, a slot, a subframe, a frame), as well as frequency resources (e.g., subcarriers, carriers). In some examples, the UE 115 may communicate with a primary cell, a primary secondary cell, or a secondary cell using a component carrier 805-a, a component carrier 805-b, or a component carrier 805-c, or any combination thereof. Examples of a primary cell, a primary secondary cell, or a secondary cell may be examples of a base station 105, as described with reference to FIGS. 1 and 2.

In the example of FIG. 8, a UE 115 may receive, from a base station 105, a DCI message 810-a on the component carrier 805-b. The DCI message 810-a may schedule a PDSCH 815-a. In some examples, the UE 115 may receive, from the base station 105, a DCI message 810-b on the component carrier 805-c. The DCI message 810-b may schedule both a PDSCH 815-b associated with the component carrier 805-a and a PDSCH 815-c associated with the component carrier 805-c. In some other examples, the UE 115 may receive, from the base station 105, a DCI message 810-c on the component carrier 805-b. The DCI message 810-c may schedule a PDSCH 815-d and a PUCCH 820. The UE 115 may be configured to provide HARQ feedback (e.g., a HARQ ACK, a HARQ NACK) for the PDSCH 815 via the PUCCH 820.

In some examples, among all the DCI messages 810 that indicate a same slot for the PUCCH 820 for HARQ feedback, each DCI message 810 may be associated with a component carrier index associated with the component carriers 805. The UE 115 may order the DCI messages 810 based on each corresponding component carrier index, in addition to a PDCCH monitoring occasion associated with each DCI message 810. The UE 115 may then determine a last DCI message 810 based on the ordering and use the last DCI message 810 PRI to determine a resource for the PUCCH 820. Thus, PM determine PUCCH resource within a slot, which is determined by $K_1$. The UE 115 may support a selection rule, where the UE 115 may a select a slot of multiple slots based on a component carrier index associated with a component carrier. For example, the UE 115 may select a first slot or a second slot based on a first component carrier index associated with a first component carrier and a second component carrier index associated with a second component carrier.

In some examples, the UE 115 may select a slot based on larger or a smaller component carrier index (e.g., between the first component carrier index and the second component carrier index). In some other examples, the UE 115 may select a slot based on a smaller or a larger subcarrier spacing of component carrier indices (e.g., between the first component carrier index and the second component carrier index). For example, in some examples, the UE 115 may for each DCI message 810, select a largest scheduled component carrier index (e.g., in case of more than one scheduled component carrier). In this example, a last DCI message may be a DCI message that schedules the largest component carrier index (whether the DCI message schedules one component carrier or two component carriers) in a last PDCCH monitoring occasion. Alternatively, for each DCI message 810, the UE 115 may select a smallest scheduled component carrier index (e.g., in case of more than one scheduled component carrier).

The associated component carrier index for each DCI message 810 may be based on a scheduling cell (e.g. the base station 105), which include a component carrier that the DCI message 810 is transmitted on (instead of a scheduled cell). The UE 115 may then order the DCI messages 810 based on the associated component carrier index in addition to a PDCCH monitoring occasion. The UE 115 may determine the last DCI message, and use the PM of the last DCI message for PUCCH resource selection. In some examples, if there are two DCI messages in the same cell (e.g., scheduling cell) in a same PDCCH monitoring occasion, the order may be determined based on some other criteria (e.g., a scheduled cell).

Figure 9:
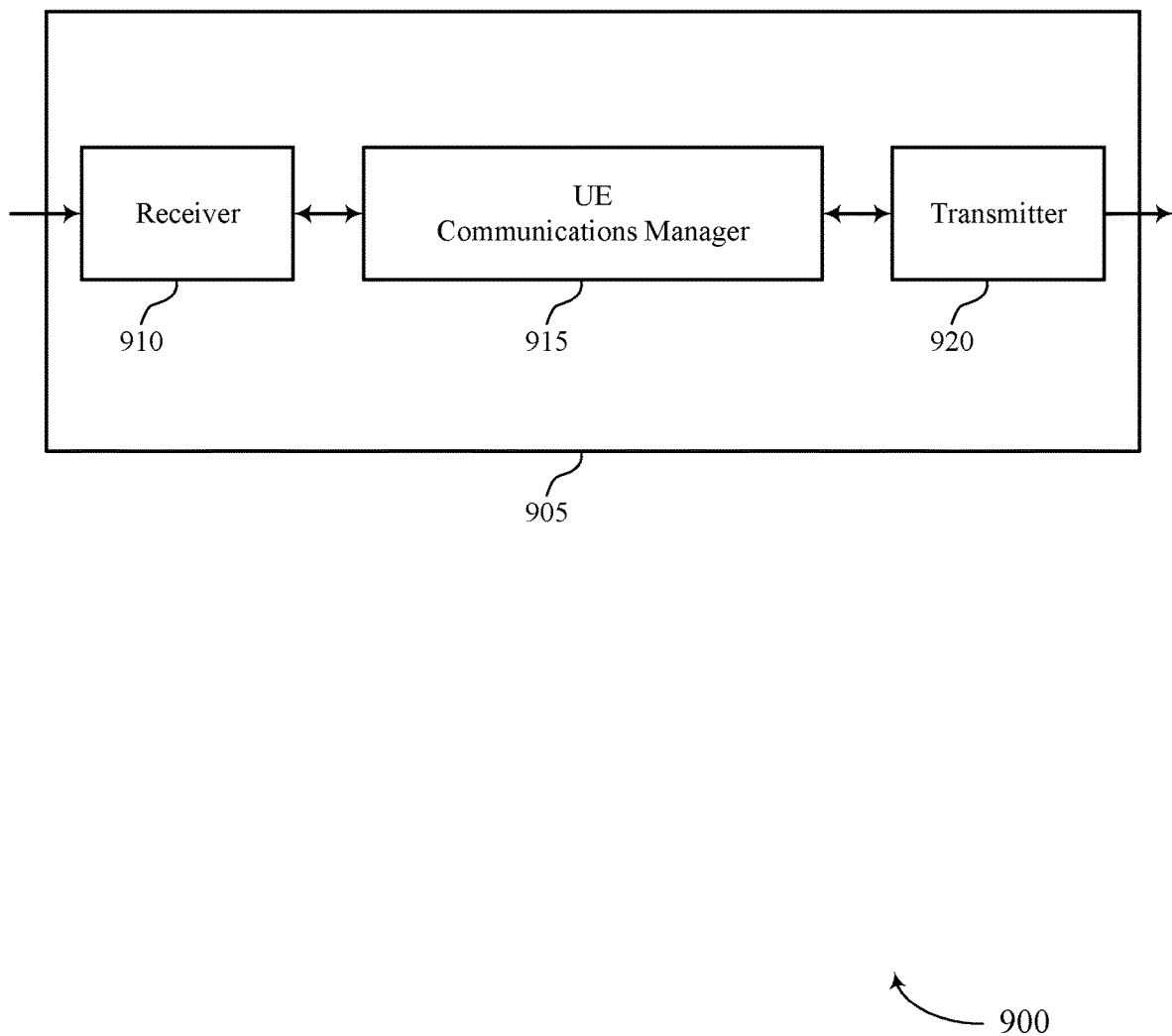
FIGS. 9 and 10 show block diagrams of devices that support acknowledgement feedback for multi-component carrier scheduling in accordance with aspects of the present disclosure.

FIG. 9 shows a block diagram 900 of a device 905 that supports acknowledgement feedback for multi-component carrier scheduling in accordance with aspects of the present disclosure. The device 905 may be an example of aspects of a UE 115 as described herein. The device 905 may include a receiver 910, a UE communications manager 915, and a transmitter 920. The device 905 may also include one or more processors, memory coupled with the one or more processors, and instructions stored in the memory that are executable by the one or more processors to enable the one or more processors to perform the acknowledgement feedback for multi-component carrier scheduling features discussed herein. Each of these components may be in communication with one another (e.g., via one or more buses).

The receiver 910 may receive information such as packets, user data, or control information associated with various information channels (e.g., control channels, data channels, and information related to acknowledgement feedback for multi-component carrier scheduling, etc.). Information may be passed on to other components of the device 905. The receiver 910 may be an example of aspects of the transceiver 1220 described with reference to FIG. 12. The receiver 910 may utilize a single antenna or a set of antennas.

The UE communications manager 915 may receive a DCI message scheduling a first transmission on a first downlink data channel of a first component carrier and a second transmission on a second downlink data channel of a second component carrier, the received DCI message providing an indication of a timing offset for acknowledgement information associated with the first transmission and the second transmission, select, based on a selection rule, one of a first slot or a second slot, the first slot associated with the first transmission on the first downlink data channel and the second slot associated with the second transmission on the second downlink data channel, determine, based on the indicated timing offset and the selected one of the first slot or the second slot, a third slot to use to transmit the acknowledgement information, and transmit, during the determined third slot, the acknowledgement information associated with the first transmission and the second transmission on a control channel.

The UE communications manager 915 may also receive a set of DCI messages that indicate a same slot to be used to transmit acknowledgement information for a set of downlink data channels scheduled by the set of DCI messages, the set of DCI messages including at least one DCI message scheduling a first downlink data channel of a first component carrier and a second downlink data channel of a second component carrier, determine, for each DCI message in the set of DCI messages including the at least one DCI message, an associated component carrier, order the set of DCI messages based on, for each DCI message of the set of DCI messages, an associated component carrier index and a control channel monitoring occasion associated with the DCI message, identify a latest DCI message based on the ordering of the set of DCI messages, determine, based on an indication in the latest DCI message, resources for an uplink control channel in the slot to use to transmit acknowledgement information for the set of downlink data channels, and transmit the acknowledgement information on the determined resources for the uplink control channel. The UE communications manager 915 may be an example of aspects of the UE communications manager 1210 described herein.

The UE communications manager 915, or its sub-components, may be implemented in hardware, code (e.g., software or firmware) executed by a processor, or any combination thereof. If implemented in code executed by a processor, the functions of the UE communications manager 915, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The UE communications manager 915, or its sub-components, may be physically located at various positions, including being distributed such that portions of functions are implemented at different physical locations by one or more physical components. In some examples, the UE communications manager 915, or its sub-components, may be a separate and distinct component in accordance with various aspects of the present disclosure. In some examples, the UE communications manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
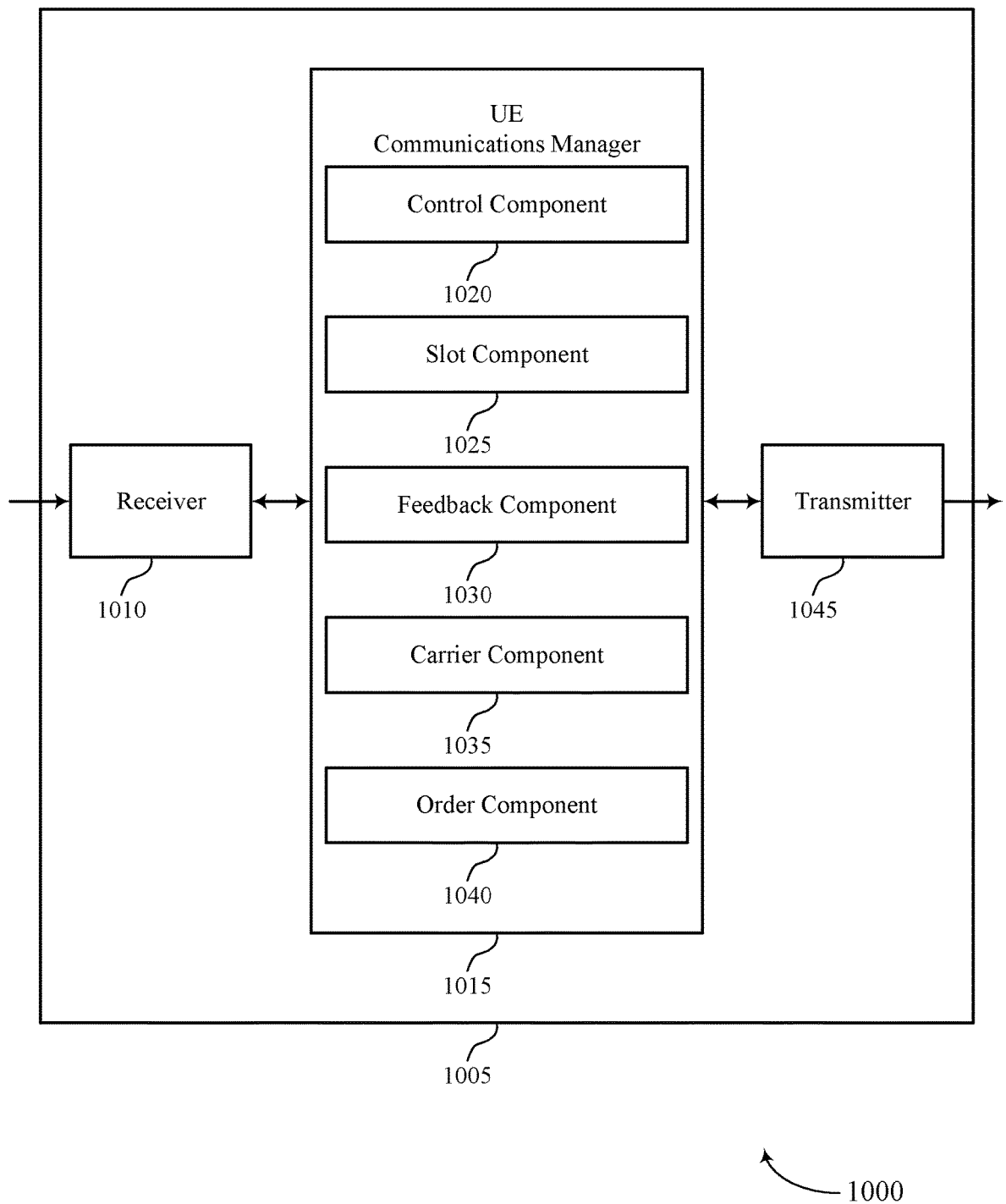

FIG. 10 shows a block diagram 1000 of a device 1005 that supports acknowledgement feedback for multi-component carrier scheduling in accordance with aspects of the present disclosure. The device 1005 may be an example of aspects of a device 905, or a UE 115 as described herein. The device 1005 may include a receiver 1010, a UE communications manager 1015, and a transmitter 1045. The device 1005 may also include a processor. Each of these components may be in communication with one another (e.g., via one or more buses).

The receiver 1010 may receive information such as packets, user data, or control information associated with various information channels (e.g., control channels, data channels, and information related to acknowledgement feedback for multi-component carrier scheduling, etc.). Information may be passed on to other components of the device 1005. The receiver 1010 may be an example of aspects of the transceiver 1220 described with reference to FIG. 12. The receiver 1010 may utilize a single antenna or a set of antennas.

The UE communications manager 1015 may be an example of aspects of the UE communications manager 915 as described herein. The UE communications manager 1015 may include a control component 1020, a slot component 1025, a feedback component 1030, a carrier component 1035, and an order component 1040. The UE communications manager 1015 may be an example of aspects of the UE communications manager 1210 described herein.

The control component 1020 may receive a DCI message scheduling a first transmission on a first downlink data channel of a first component carrier and a second transmission on a second downlink data channel of a second component carrier, the received DCI message providing an indication of a timing offset for acknowledgement information associated with the first transmission and the second transmission. The slot component 1025 may select, based on a selection rule, one of a first slot or a second slot, the first slot associated with the first transmission on the first downlink data channel and the second slot associated with the second transmission on the second downlink data channel and determine, based on the indicated timing offset and the selected one of the first slot or the second slot, a third slot to use to transmit the acknowledgement information. The feedback component 1030 may transmit, during the determined third slot, the acknowledgement information associated with the first transmission and the second transmission on a control channel.

The control component 1020 may receive a set of DCI messages that indicate a same slot to be used to transmit acknowledgement information for a set of downlink data channels scheduled by the set of DCI messages, the set of DCI messages including at least one DCI message scheduling a first downlink data channel of a first component carrier and a second downlink data channel of a second component carrier. The carrier component 1035 may determine, for each DCI message in the set of DCI messages including the at least one DCI message, an associated component carrier. The order component 1040 may order the set of DCI messages based on, for each DCI message of the set of DCI messages, an associated component carrier index and a control channel monitoring occasion associated with the DCI message and identify a latest DCI message based on the ordering of the set of DCI messages. The feedback component 1030 may determine, based on an indication in the latest DCI message, resources for an uplink control channel in the slot to use to transmit acknowledgement information for the set of downlink data channels and transmit the acknowledgement information on the determined resources for the uplink control channel.

The control component 1020, the slot component 1025, the feedback component 1030, the carrier component 1035, and the order component 1040 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of acknowledgement feedback for multi-component carrier scheduling discussed herein. A transceiver processor may be collocated with and/or communicate with (e.g., direct the operations of) a transceiver of the device 1005. A radio processor may be collocated with and/or communicate with (e.g., direct the operations of) a radio (e.g., an NR radio, an LTE radio, a Wi-Fi radio) of the device 1005. A transmitter processor may be collocated with and/or communicate with (e.g., direct the operations of) a transmitter of the device 1005. A receiver processor may be collocated with and/or communicate with (e.g., direct the operations of) a receiver of the device 1005.

The transmitter 1045 may transmit signals generated by other components of the device 1005. In some examples, the transmitter 1045 may be collocated with a receiver 1010 in a transceiver module. For example, the transmitter 1045 may be an example of aspects of the transceiver 1220 described with reference to FIG. 12. The transmitter 1045 may utilize a single antenna or a set of antennas.

In some cases, the control component 1020, the slot component 1025, the feedback component 1030, the carrier component 1035, and the order component 1040 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the control component 1020, the slot component 1025, the feedback component 1030, the carrier component 1035, and the order component 1040 discussed herein. A transceiver processor may be collocated with and/or communicate with (e.g., direct the operations of) a transceiver of the device. A radio processor may be collocated with and/or communicate with (e.g., direct the operations of) a radio (e.g., an NR radio, an LTE radio, a Wi-Fi radio) of the device. A transmitter processor may be collocated with and/or communicate with (e.g., direct the operations of) a transmitter of the device. A receiver processor may be collocated with and/or communicate with (e.g., direct the operations of) a receiver of the device.

Figure 11:
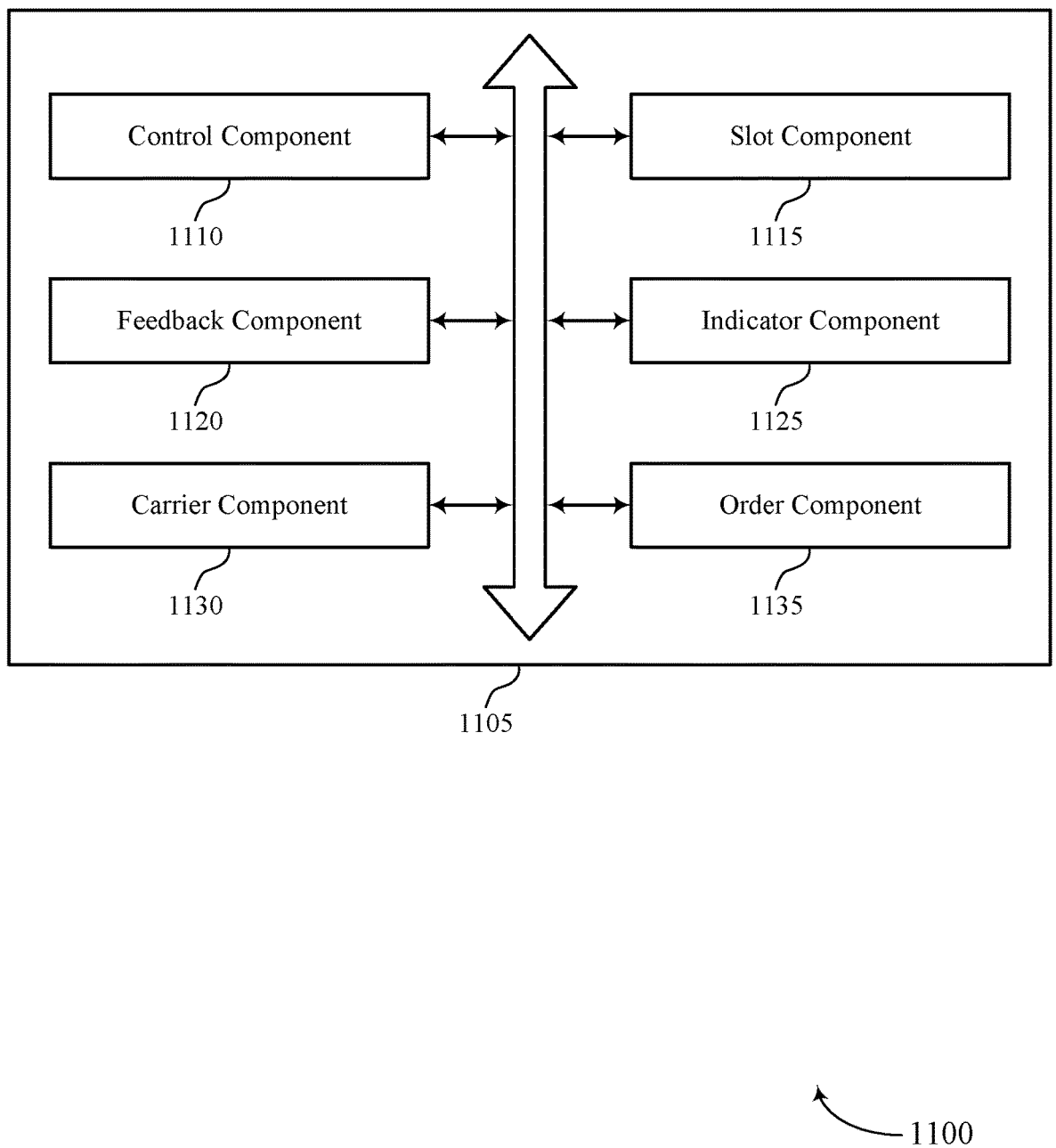
FIG. 11 shows a block diagram of a user equipment (UE) communications manager that supports acknowledgement feedback for multi-component carrier scheduling in accordance with aspects of the present disclosure.

FIG. 11 shows a block diagram 1100 of a UE communications manager 1105 that supports acknowledgement feedback for multi-component carrier scheduling in accordance with aspects of the present disclosure. The UE communications manager 1105 may be an example of aspects of a UE communications manager 915, a UE communications manager 1015, or a UE communications manager 1210 described herein. The UE communications manager 1105 may include a control component 1110, a slot component 1115, a feedback component 1120, an indicator component 1125, a carrier component 1130, and an order component 1135. Each of these components may communicate, directly or indirectly, with one another (e.g., via one or more buses).

The control component 1110, the slot component 1115, the feedback component 1120, the indicator component 1125, the carrier component 1130, and the order component 1135 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of acknowledgement feedback for multi-component carrier scheduling discussed herein.

The control component 1110 may receive a DCI message scheduling a first transmission on a first downlink data channel of a first component carrier and a second transmission on a second downlink data channel of a second component carrier, the received DCI message providing an indication of a timing offset for acknowledgement information associated with the first transmission and the second transmission. In some examples, the control component 1110 may receive a set of DCI messages that indicate a same slot to be used to transmit acknowledgement information for a set of downlink data channels scheduled by the set of DCI messages, the set of DCI messages including at least one DCI message scheduling a first downlink data channel of a first component carrier and a second downlink data channel of a second component carrier. In some examples, the control component 1110 may determine the third slot to use to transmit the acknowledgement information is based on the first subcarrier spacing or the second subcarrier spacing, or both. In some cases, the first component carrier corresponds to a first subcarrier spacing and the second component carrier corresponds to a second subcarrier spacing different than the first subcarrier spacing.

The slot component 1115 may select, based on a selection rule, one of a first slot or a second slot, the first slot associated with the first transmission on the first downlink data channel and the second slot associated with the second transmission on the second downlink data channel. In some examples, the slot component 1115 may determine, based on the indicated timing offset and the selected one of the first slot or the second slot, a third slot to use to transmit the acknowledgement information. In some examples, the slot component 1115 may determine, based on the received DCI message, a beginning slot of the first downlink data channel associated with the first component carrier, an ending slot of the first downlink data channel associated with the first component carrier, or a duration of the first downlink data channel associated with the first component carrier, or a combination thereof, where determining the third slot to use to transmit the acknowledgement information is based on the beginning slot of the first downlink data channel, the ending slot of the first downlink data channel, or the duration of the first downlink data channel, or a combination thereof.

In some examples, the slot component 1115 may determine, based on the received DCI message, a beginning slot of the second downlink data channel associated with the second component carrier, an ending slot of the second downlink data channel associated with the second component carrier, or a duration of the second downlink data channel associated with the second component carrier, or a combination thereof, where determining the third slot to use to transmit the acknowledgement information is based on the beginning slot of the second downlink data channel, the ending slot of the second downlink data channel, or the duration of the second downlink data channel, or a combination thereof. In some examples, the slot component 1115 may scale one or more of the beginning slot of the first downlink data channel, the ending slot of the first downlink data channel, the duration of the first downlink data channel, the beginning slot of the second downlink data channel, the ending slot of the second downlink data channel, or the duration of the second downlink data channel, or a combination thereof. In some cases, the third slot includes a slot to transmit the acknowledgement information associated with the first transmission and the second transmission. In some cases, the selection rule includes selecting one of the first slot or the second slot based on the first slot occurring before the second slot. In some cases, the selection rule includes selecting one of the first slot or the second slot based on the first slot occurring after the second slot.

The feedback component 1120 may transmit, during the determined third slot, the acknowledgement information associated with the first transmission and the second transmission on a control channel. In some examples, the feedback component 1120 may determine, based on an indication in the latest DCI message, resources for an uplink control channel in the slot to use to transmit acknowledgement information for the set of downlink data channels. In some examples, the feedback component 1120 may transmit the acknowledgement information on the determined resources for the uplink control channel. In some examples, the feedback component 1120 may exclude, based at last in part on an absence of the timing offset in a set of timing offsets, feedback associated with the first downlink data channel or the second downlink data channel from the acknowledgement information associated with the first transmission and the second transmission on the control channel.

The carrier component 1130 may determine, for each DCI message in the set of DCI messages including the at least one DCI message, an associated component carrier. In some examples, the carrier component 1130 may determine to use a first component carrier index for the associated component carrier index based on the first component carrier index being greater than the second component carrier index. In some examples, the carrier component 1130 may determine to use the first component carrier index for the associated component carrier index based on the first component carrier index being less than the second component carrier index. In some cases, the associated component carrier index is a first component carrier index corresponding to the first component carrier or a second component carrier index corresponding to the second component carrier. In some cases, the one or more component carrier indices indicated by the DCI message is based on a scheduling cell.

The order component 1135 may order the set of DCI messages based on, for each DCI message of the set of DCI messages, an associated component carrier index and a control channel monitoring occasion associated with the DCI message. In some examples, the order component 1135 may identify a latest DCI message based on the ordering of the set of DCI messages. In some examples, the order component 1135 may order the set of DCI messages is based on, for each DCI message of the set of DCI messages, a scheduled cell of each DCI message of the set of DCI messages. In some cases, the indication in the latest DCI message includes a PRI.

The indicator component 1125 may identify a first indicator of a set of indicators in the received DCI message, the first indicator including a first time domain resource allocation field for the first downlink data channel associated with the first component carrier. In some examples, the indicator component 1125 may identify a second indicator of the set of indicators in the received DCI message, the second indicator including a second time domain resource allocation field for the second downlink data channel associated with the second component carrier, where determining the third slot to use to transmit the acknowledgement information is based on the first and second time domain resource allocation fields. In some examples, the indicator component 1125 may identify an indicator of a set of indicators in the received DCI message, the indicator including a time domain resource allocation field for both the first downlink data channel associated with the first component carrier and the second downlink data channel associated with the second component carrier, where determining the third slot to use to transmit the acknowledgement information is based on the time domain resource allocation field.

In some cases, the control component 1110, the slot component 1115, the feedback component 1120, the indicator component 1125, the carrier component 1130, and the order component 1135 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the control component 1110, the slot component 1115, the feedback component 1120, the indicator component 1125, the carrier component 1130, and the order component 1135 discussed herein.

Figure 12:
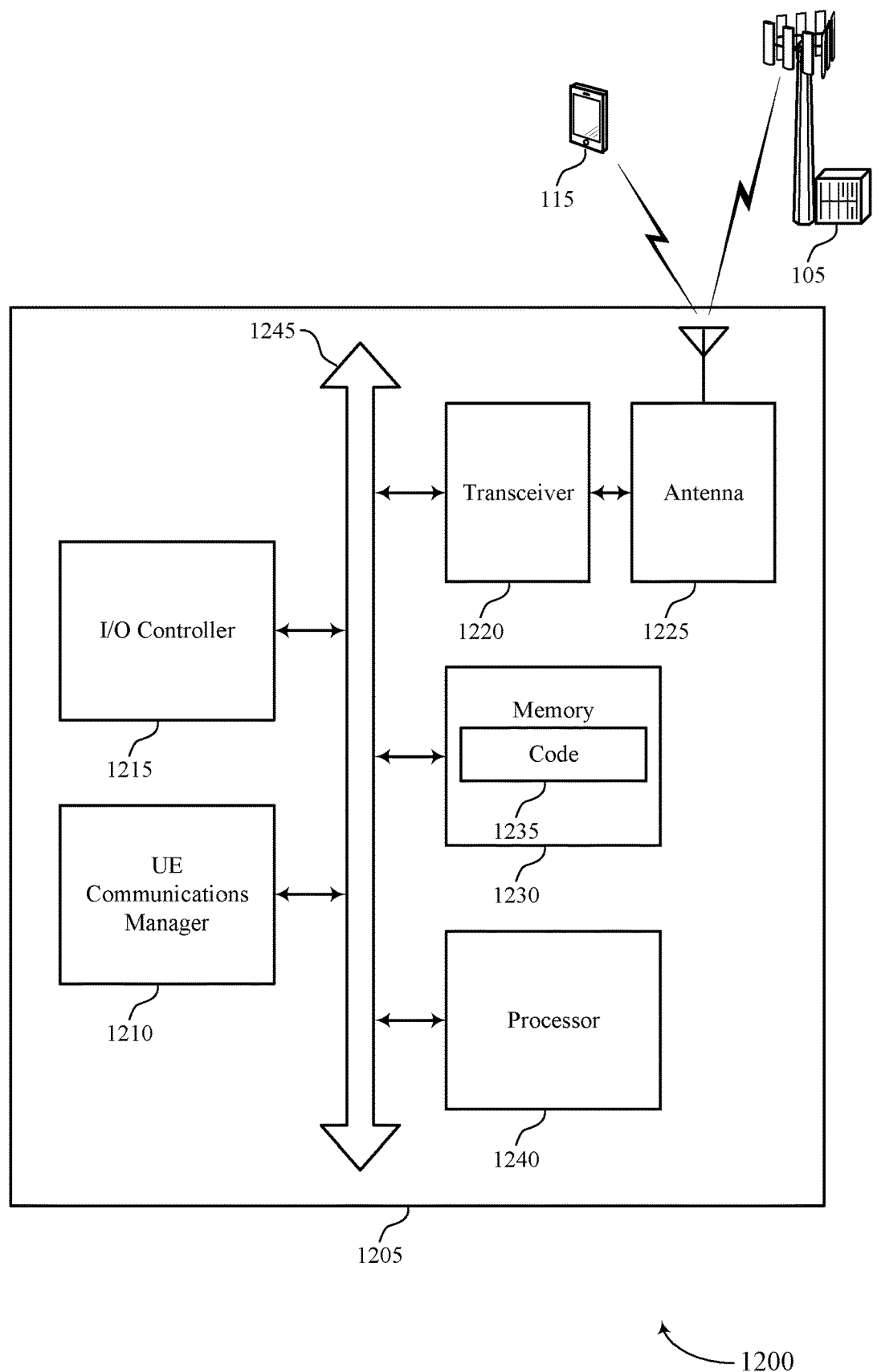
FIG. 12 shows a diagram of a system including a device that supports acknowledgement feedback for multi-component carrier scheduling in accordance with aspects of the present disclosure.

FIG. 12 shows a diagram of a system 1200 including a device 1205 that supports acknowledgement feedback for multi-component carrier scheduling in accordance with aspects of the present disclosure. The device 1205 may be an example of or include the components of device 905, device 1005, or a UE 115 as described herein. The device 1205 may include components for bi-directional voice and data communications including components for transmitting and receiving communications, including a UE communications manager 1210, an I/O controller 1215, a transceiver 1220, an antenna 1225, memory 1230, and a processor 1240. These components may be coupled with or via (e.g., in electronic communication via) one or more buses (e.g., bus 1245).

The UE communications manager 1210 may receive a DCI message scheduling a first transmission on a first downlink data channel of a first component carrier and a second transmission on a second downlink data channel of a second component carrier, the received DCI message providing an indication of a timing offset for acknowledgement information associated with the first transmission and the second transmission, select, based on a selection rule, one of a first slot or a second slot, the first slot associated with the first transmission on the first downlink data channel and the second slot associated with the second transmission on the second downlink data channel, determine, based on the indicated timing offset and the selected one of the first slot or the second slot, a third slot to use to transmit the acknowledgement information, and transmit, during the determined third slot, the acknowledgement information associated with the first transmission and the second transmission on a control channel.

The UE communications manager 1210 may also receive a set of DCI messages that indicate a same slot to be used to transmit acknowledgement information for a set of downlink data channels scheduled by the set of DCI messages, the set of DCI messages including at least one DCI message scheduling a first downlink data channel of a first component carrier and a second downlink data channel of a second component carrier, determine, for each DCI message in the set of DCI messages including the at least one DCI message, an associated component carrier, order the set of DCI messages based on, for each DCI message of the set of DCI messages, an associated component carrier index and a control channel monitoring occasion associated with the DCI message, identify a latest DCI message based on the ordering of the set of DCI messages, determine, based on an indication in the latest DCI message, resources for an uplink control channel in the slot to use to transmit acknowledgement information for the set of downlink data channels, and transmit the acknowledgement information on the determined resources for the uplink control channel.

The I/O controller 1215 may manage input and output signals for the device 1205. The I/O controller 1215 may also manage peripherals not integrated into the device 1205. In some cases, the I/O controller 1215 may represent a physical connection or port to an external peripheral. In some cases, the I/O controller 1215 may utilize an operating system such as iOS®, ANDROID®, MS-DOS®, MS-WINDOWS®, OS/2®, UNIX®, LINUX®, or another known operating system. In other cases, the I/O controller 1215 may represent or interact with a modem, a keyboard, a mouse, a touchscreen, or a similar device. In some cases, the I/O controller 1215 may be implemented as part of a processor. In some cases, a user may interact with the device 1205 via the I/O controller 1215 or via hardware components controlled by the I/O controller 1215.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas. In some cases, the device 1205 may include a single antenna 1225. However, in some cases, the device 1205 may have more than one antenna 1225, which may be capable of concurrently transmitting or receiving multiple wireless transmissions.

The memory 1230 may include RAM and ROM. The memory 1230 may store computer-readable, computer-executable code 1235 including instructions that, when executed, cause the processor to perform various functions described herein. In some cases, the memory 1230 may contain, among other things, a BIOS which may control basic hardware or software operation such as the interaction with peripheral components or devices.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting acknowledgement feedback for multi-component carrier scheduling).

Figure 13:
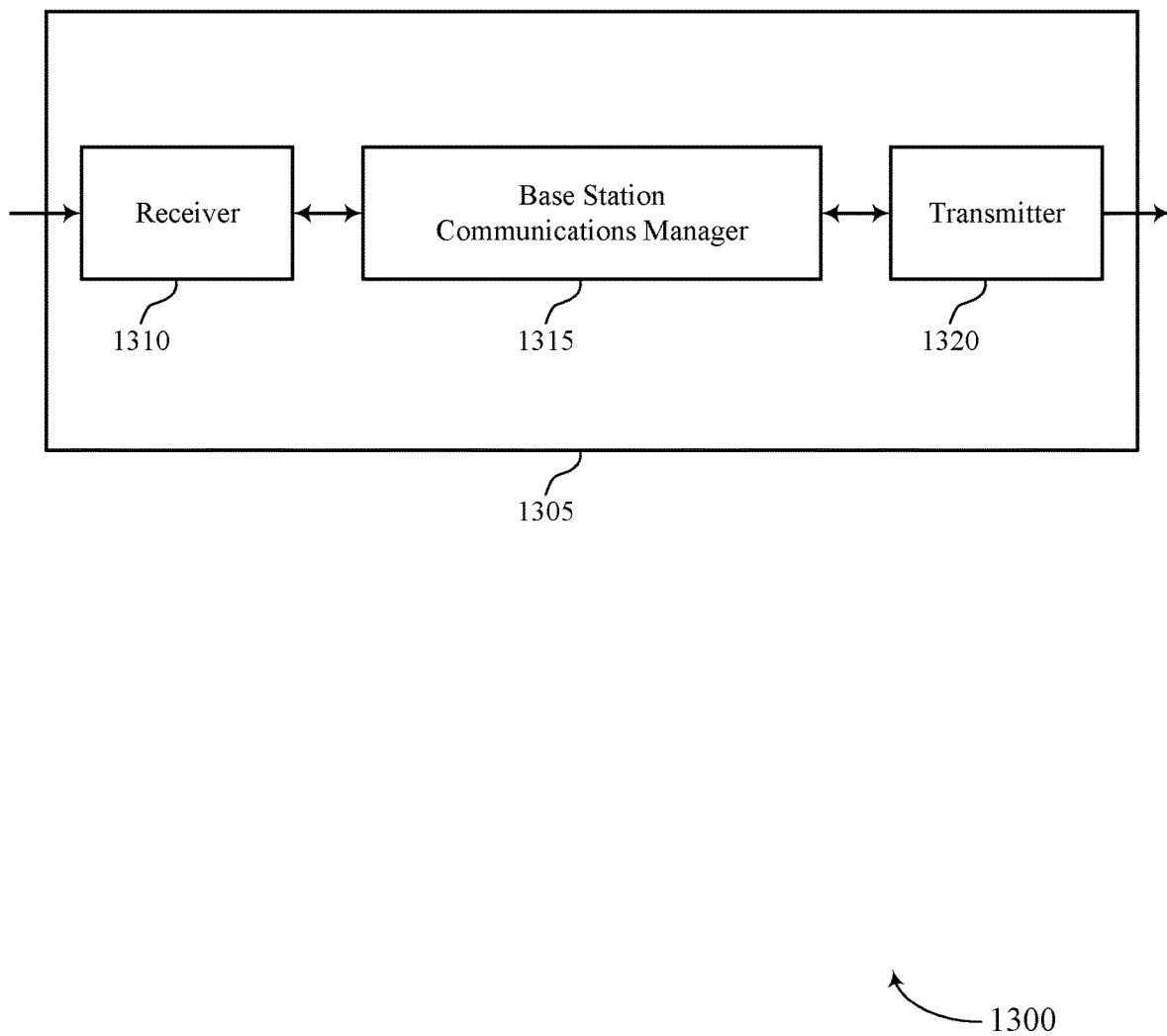
FIGS. 13 and 14 show block diagrams of devices that support acknowledgement feedback for multi-component carrier scheduling in accordance with aspects of the present disclosure.

FIG. 13 shows a block diagram 1300 of a device 1305 that supports acknowledgement feedback for multi-component carrier scheduling in accordance with aspects of the present disclosure. The device 1305 may be an example of aspects of a base station 105 as described herein. The device 1305 may include a receiver 1310, a base station communications manager 1315, and a transmitter 1320. The device 1305 may also include one or more processors, memory coupled with the one or more processors, and instructions stored in the memory that are executable by the one or more processors to enable the one or more processors to perform the acknowledgement feedback for multi-component carrier scheduling features discussed herein. Each of these components may be in communication with one another (e.g., via one or more buses).

The receiver 1310 may receive information such as packets, user data, or control information associated with various information channels (e.g., control channels, data channels, and information related to acknowledgement feedback for multi-component carrier scheduling, etc.). Information may be passed on to other components of the device 1305. The receiver 1310 may be an example of aspects of the transceiver 1620 described with reference to FIG. 16. The receiver 1310 may utilize a single antenna or a set of antennas.

The base station communications manager 1315 may transmit a DCI message scheduling a first transmission on a first downlink data channel of a first component carrier and a second transmission on a second downlink data channel of a second component carrier, the transmitted DCI message providing an indication of a timing offset for acknowledgement information associated with the first transmission and the second transmission, a first slot associated with the first transmission on the first downlink data channel and a second slot associated with the second transmission on the second downlink data channel, determine, based on the indicated timing offset and the selected one of the first slot or the second slot, a third slot to use to transmit the acknowledgement information, and receive, during a third slot, the acknowledgement information associated with the first transmission and the second transmission on a control channel.

The base station communications manager 1315 may also transmit a set of DCI messages that indicate a same slot to be used to receive acknowledgement information for a set of downlink data channels scheduled by the set of DCI, the set of DCI messages including at least one DCI message scheduling a first downlink data channel of a first component carrier and a second downlink data channel of a second component carrier, determine that a UE is to use an associated component carrier index including one of a first index associated with the first component carrier or a second index associated with a second component carrier to order the at least one DCI message, and receive the acknowledgement information for the set of downlink data channels on resources for the uplink control channel determined by the UE based on an indication in a latest DCI message identified by an ordering of the set of DCI messages. The base station communications manager 1315 may be an example of aspects of the base station communications manager 1610 described herein.

The base station communications manager 1315, or its sub-components, may be implemented in hardware, code (e.g., software or firmware) executed by a processor, or any combination thereof. If implemented in code executed by a processor, the functions of the base station communications manager 1315, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The base station communications manager 1315, or its sub-components, may be physically located at various positions, including being distributed such that portions of functions are implemented at different physical locations by one or more physical components. In some examples, the base station communications manager 1315, or its sub-components, may be a separate and distinct component in accordance with various aspects of the present disclosure. In some examples, the base station communications manager 1315, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1320 may transmit signals generated by other components of the device 1305. In some examples, the transmitter 1320 may be collocated with a receiver 1310 in a transceiver module. For example, the transmitter 1320 may be an example of aspects of the transceiver 1620 described with reference to FIG. 16. The transmitter 1320 may utilize a single antenna or a set of antennas.

Figure 14:
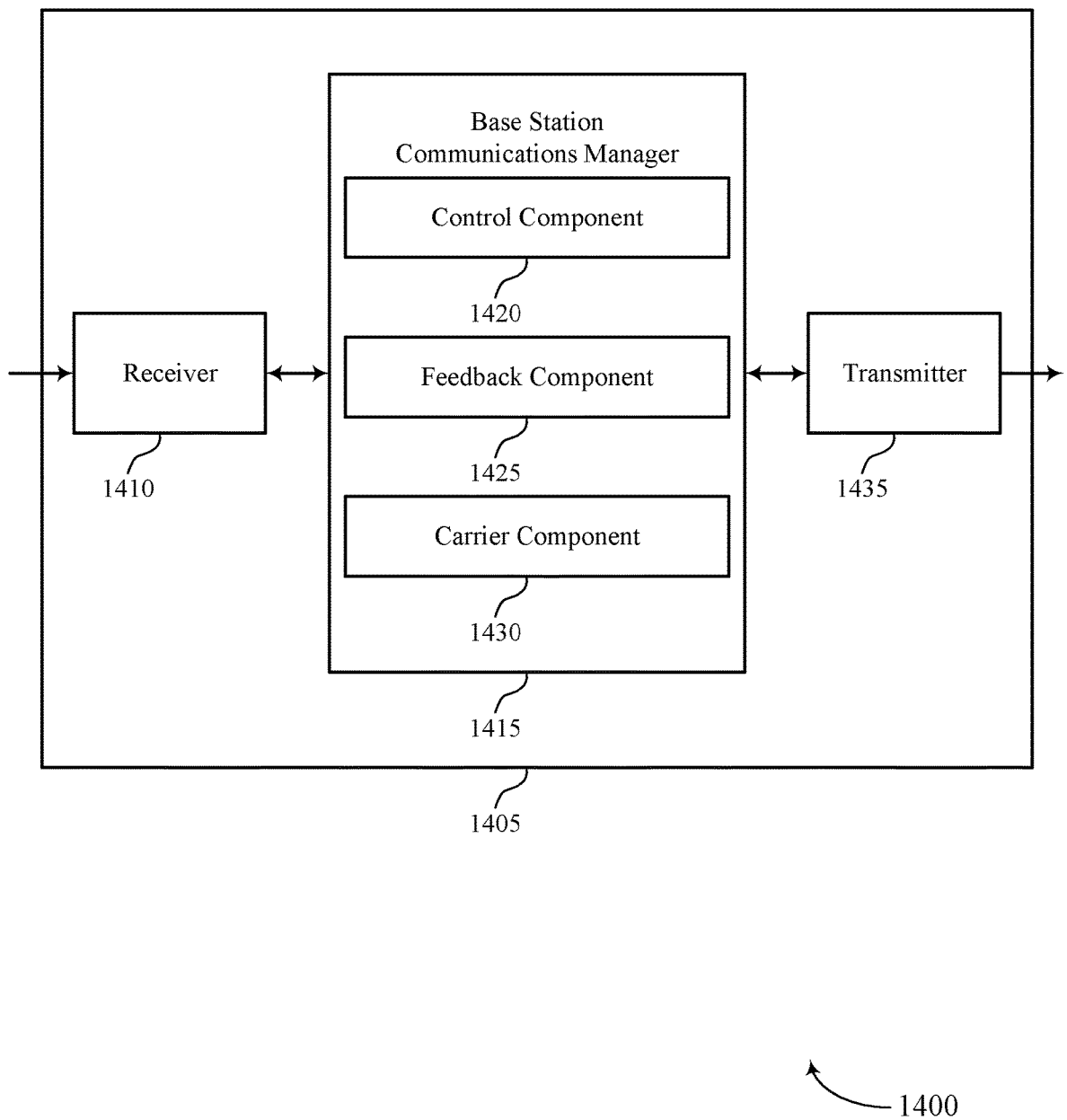

FIG. 14 shows a block diagram 1400 of a device 1405 that supports acknowledgement feedback for multi-component carrier scheduling in accordance with aspects of the present disclosure. The device 1405 may be an example of aspects of a device 1305, or a base station 105 as described herein. The device 1405 may include a receiver 1410, a base station communications manager 1415, and a transmitter 1435. The device 1405 may also include a processor. Each of these components may be in communication with one another (e.g., via one or more buses).

The receiver 1410 may receive information such as packets, user data, or control information associated with various information channels (e.g., control channels, data channels, and information related to acknowledgement feedback for multi-component carrier scheduling, etc.). Information may be passed on to other components of the device 1405. The receiver 1410 may be an example of aspects of the transceiver 1620 described with reference to FIG. 16. The receiver 1410 may utilize a single antenna or a set of antennas.

The base station communications manager 1415 may be an example of aspects of the base station communications manager 1315 as described herein. The base station communications manager 1415 may include a control component 1420, a feedback component 1425, and a carrier component 1430. The base station communications manager 1415 may be an example of aspects of the base station communications manager 1610 described herein.

The control component 1420 may transmit a DCI message scheduling a first transmission on a first downlink data channel of a first component carrier and a second transmission on a second downlink data channel of a second component carrier, the transmitted DCI message providing an indication of a timing offset for acknowledgement information associated with the first transmission and the second transmission, a first slot associated with the first transmission on the first downlink data channel and a second slot associated with the second transmission on the second downlink data channel. The feedback component 1425 may receive, during a third slot, the acknowledgement information associated with the first transmission and the second transmission on a control channel.

The control component 1420 may transmit a set of DCI messages that indicate a same slot to be used to receive acknowledgement information for a set of downlink data channels scheduled by the set of DCI, the set of DCI messages including at least one DCI message scheduling a first downlink data channel of a first component carrier and a second downlink data channel of a second component carrier. The carrier component 1430 may determine that a UE is to use an associated component carrier index including one of a first index associated with the first component carrier or a second index associated with a second component carrier to order the at least one DCI message. The feedback component 1425 may receive the acknowledgement information for the set of downlink data channels on resources for the uplink control channel determined by the UE based on an indication in a latest DCI message identified by an ordering of the set of DCI messages.

The control component 1420, the feedback component 1425, and the carrier component 1430 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of acknowledgement feedback for multi-component carrier scheduling discussed herein. A transceiver processor may be collocated with and/or communicate with (e.g., direct the operations of) a transceiver of the device 1405. A radio processor may be collocated with and/or communicate with (e.g., direct the operations of) a radio (e.g., an NR radio, an LTE radio, a Wi-Fi radio) of the device 1405. A transmitter processor may be collocated with and/or communicate with (e.g., direct the operations of) a transmitter of the device 1405. A receiver processor may be collocated with and/or communicate with (e.g., direct the operations of) a receiver of the device 1405.

The transmitter 1435 may transmit signals generated by other components of the device 1405. In some examples, the transmitter 1435 may be collocated with a receiver 1410 in a transceiver module. For example, the transmitter 1435 may be an example of aspects of the transceiver 1620 described with reference to FIG. 16. The transmitter 1435 may utilize a single antenna or a set of antennas.

In some cases, the control component 1420, the feedback component 1425, and the carrier component 1430 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of [copy-paste in the 2 or more step modules within the communication manager] discussed herein. A transceiver processor may be collocated with and/or communicate with (e.g., direct the operations of) a transceiver of the device. A radio processor may be collocated with and/or communicate with (e.g., direct the operations of) a radio (e.g., an NR radio, an LTE radio, a Wi-Fi radio) of the device. A transmitter processor may be collocated with and/or communicate with (e.g., direct the operations of) a transmitter of the device. A receiver processor may be collocated with and/or communicate with (e.g., direct the operations of) a receiver of the device.

Figure 15:
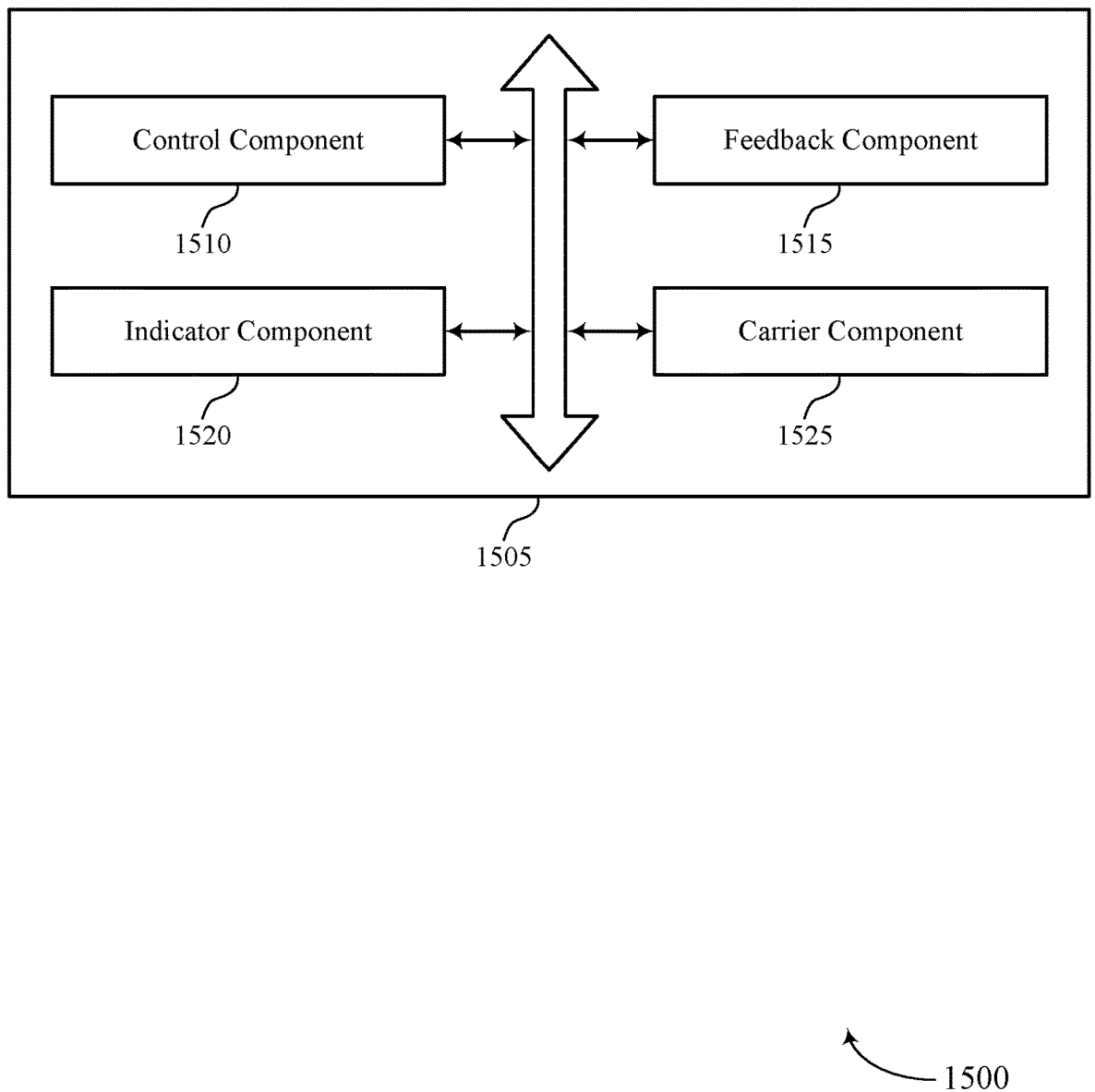
FIG. 15 shows a block diagram of a base station communications manager that supports acknowledgement feedback for multi-component carrier scheduling in accordance with aspects of the present disclosure.

FIG. 15 shows a block diagram 1500 of a base station communications manager 1505 that supports acknowledgement feedback for multi-component carrier scheduling in accordance with aspects of the present disclosure. The base station communications manager 1505 may be an example of aspects of a base station communications manager 1315, a base station communications manager 1415, or a base station communications manager 1610 described herein. The base station communications manager 1505 may include a control component 1510, a feedback component 1515, an indicator component 1520, and a carrier component 1525. Each of these modules may communicate, directly or indirectly, with one another (e.g., via one or more buses).

The control component 1510, the feedback component 1515, the indicator component 1520, and the carrier component 1525 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of acknowledgement feedback for multi-component carrier scheduling discussed herein.

The control component 1510 may transmit a DCI message scheduling a first transmission on a first downlink data channel of a first component carrier and a second transmission on a second downlink data channel of a second component carrier, the transmitted DCI message providing an indication of a timing offset for acknowledgement information associated with the first transmission and the second transmission, a first slot associated with the first transmission on the first downlink data channel and a second slot associated with the second transmission on the second downlink data channel. In some examples, the control component 1510 may transmit a set of DCI messages that indicate a same slot to be used to receive acknowledgement information for a set of downlink data channels scheduled by the set of DCI, the set of DCI messages including at least one DCI message scheduling a first downlink data channel of a first component carrier and a second downlink data channel of a second component carrier. In some examples, the control component 1510 may receive, during the third slot, the acknowledgement information is based on the first subcarrier spacing or the second subcarrier spacing, or both. In some cases, the first component carrier corresponds to a first subcarrier spacing and the second component carrier corresponds to a second subcarrier spacing different than the first subcarrier spacing.

The feedback component 1515 may receive, during a third slot, the acknowledgement information associated with the first transmission and the second transmission on a control channel. In some examples, the feedback component 1515 may receive the acknowledgement information for the set of downlink data channels on resources for the uplink control channel determined by the UE based on an indication in a latest DCI message identified by an ordering of the set of DCI messages. In some cases, the third slot includes a slot to receive the acknowledgement information associated with the first transmission and the second transmission. In some cases, the acknowledgement information excludes feedback associated with the first downlink data channel or the second downlink data channel based on an absence of the timing offset in a set of timing offsets. In some cases, the ordering the set of DCI messages is based on a scheduling cell of each DCI message of the set of DCI messages. In some cases, the ordering the set of DCI messages is based on a scheduled cell of each DCI message of the set of DCI messages. In some cases, the indication in the latest DCI message includes a PRI.

The carrier component 1525 may determine that a UE is to use an associated component carrier index including one of a first index associated with the first component carrier or a second index associated with a second component carrier to order the at least one DCI message. The indicator component 1520 may assign an indicator of a set of indicator in the transmitted DCI message, the indicator including a time domain resource allocation field for both the first downlink data channel associated with the first component carrier and the second downlink data channel associated with the second component carrier, where the third slot to use to receive the acknowledgement information is based on the time domain resource allocation field. In some examples, the indicator component 1520 may assign a first indicator of a set of indicators in the received DCI message, the first indicator including a first time domain resource allocation field for the first downlink data channel associated with the first component carrier. In some examples, the indicator component 1520 may assign a second indicator of the set of indicators in the received DCI message, the second indicator including a second time domain resource allocation field for the second downlink data channel associated with the second component carrier, where the third slot to use to receive the acknowledgement information is based on the first and second time domain resource allocation fields.

In some cases, the control component 1510, the feedback component 1515, the indicator component 1520, and the carrier component 1525 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the control component 1510, the feedback component 1515, the indicator component 1520, and the carrier component 1525 discussed herein.

Figure 16:
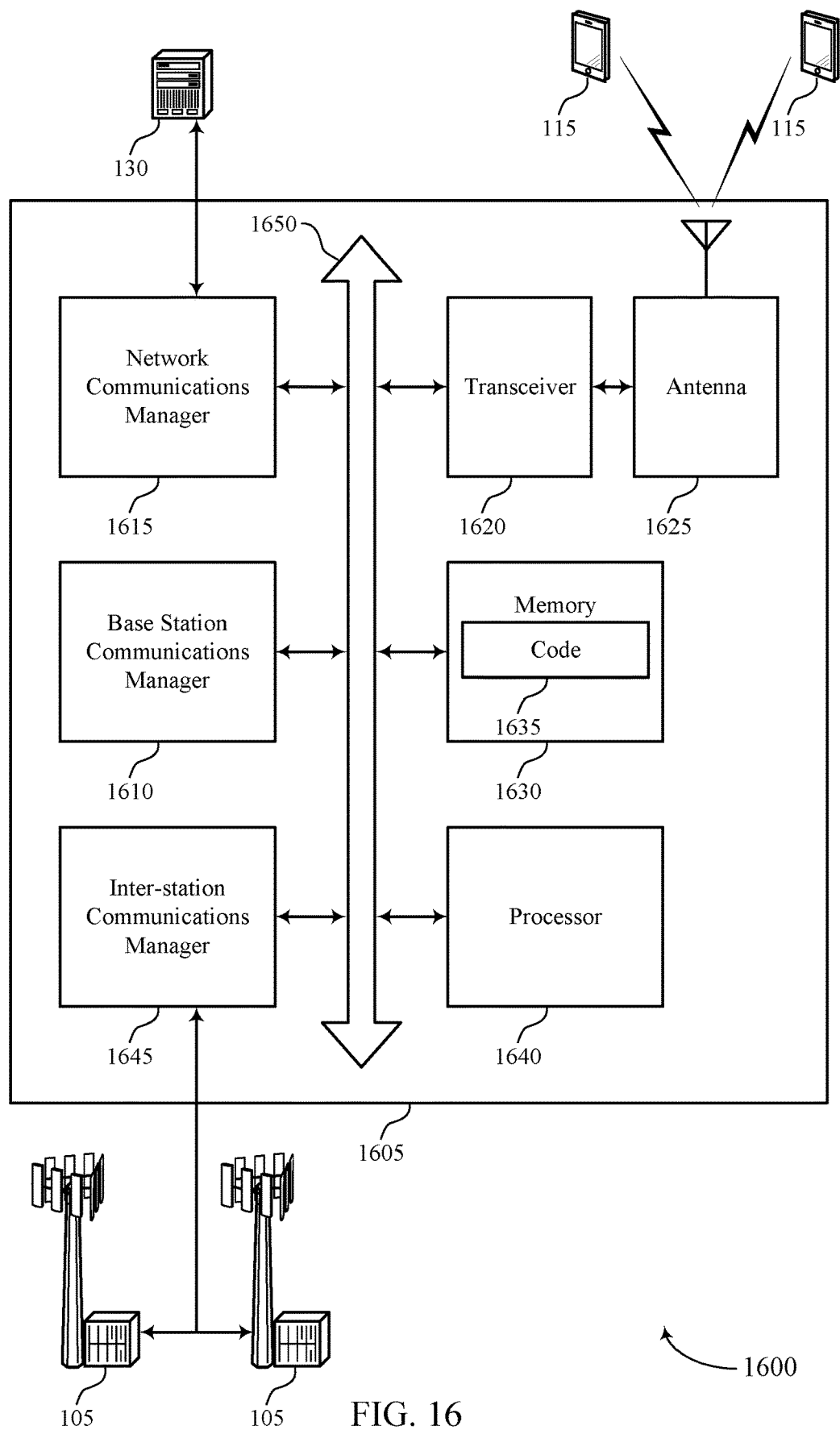
FIG. 16 shows a diagram of a system including a device that supports acknowledgement feedback for multi-component carrier scheduling in accordance with aspects of the present disclosure.

FIG. 16 shows a diagram of a system 1600 including a device 1605 that supports acknowledgement feedback for multi-component carrier scheduling in accordance with aspects of the present disclosure. The device 1605 may be an example of or include the components of device 1305, device 1405, or a base station 105 as described herein. The device 1605 may include components for bi-directional voice and data communications including components for transmitting and receiving communications, including a base station communications manager 1610, a network communications manager 1615, a transceiver 1620, an antenna 1625, memory 1630, a processor 1640, and an inter-station communications manager 1645. These components may be in coupled with or via (e.g., electronic communication via) one or more buses (e.g., bus 1650).

The base station communications manager 1610 may transmit a DCI message scheduling a first transmission on a first downlink data channel of a first component carrier and a second transmission on a second downlink data channel of a second component carrier, the transmitted DCI message providing an indication of a timing offset for acknowledgement information associated with the first transmission and the second transmission, a first slot associated with the first transmission on the first downlink data channel and a second slot associated with the second transmission on the second downlink data channel and receive, during a third slot, the acknowledgement information associated with the first transmission and the second transmission on a control channel.

The base station communications manager 1610 may also transmit a set of DCI messages that indicate a same slot to be used to receive acknowledgement information for a set of downlink data channels scheduled by the set of DCI, the set of DCI messages including at least one DCI message scheduling a first downlink data channel of a first component carrier and a second downlink data channel of a second component carrier, determine that a UE is to use an associated component carrier index including one of a first index associated with the first component carrier or a second index associated with a second component carrier to order the at least one DCI message, and receive the acknowledgement information for the set of downlink data channels on resources for the uplink control channel determined by the UE based on an indication in a latest DCI message identified by an ordering of the set of DCI messages.

The network communications manager 1615 may manage communications with the core network (e.g., via one or more wired backhaul links). For example, the network communications manager 1615 may manage the transfer of data communications for client devices, such as one or more UEs 115.

The transceiver 1620 may communicate bi-directionally, via one or more antennas, wired, or wireless links as described above. For example, the transceiver 1620 may represent a wireless transceiver and may communicate bi-directionally with another wireless transceiver. The transceiver 1620 may also include a modem to modulate the packets and provide the modulated packets to the antennas for transmission, and to demodulate packets received from the antennas. In some cases, the device 1605 may include a single antenna 1625. However, in some cases, the device 1605 may have more than one antenna 1625, which may be capable of concurrently transmitting or receiving multiple wireless transmissions.

The memory 1630 may include RAM, ROM, or a combination thereof. The memory 1630 may store computer-readable code 1635 including instructions that, when executed by a processor (e.g., the processor 1640) cause the device to perform various functions described herein. In some cases, the memory 1630 may contain, among other things, a BIOS which may control basic hardware or software operation such as the interaction with peripheral components or devices.

The code 1635 may include instructions to implement aspects of the present disclosure, including instructions to support wireless communications. The code 1635 may be stored in a non-transitory computer-readable medium such as system memory or other type of memory. In some cases, the code 1635 may not be directly executable by the processor 1640 but may cause a computer (e.g., when compiled and executed) to perform functions described herein.

The processor 1640 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1640 may be configured to operate a memory array using a memory controller. In some cases, a memory controller may be integrated into processor 1640. The processor 1640 may be configured to execute computer-readable instructions stored in a memory (e.g., the memory 1630) to cause the device 1605 to perform various functions (e.g., functions or tasks supporting acknowledgement feedback for multi-component carrier scheduling).

The inter-station communications manager 1645 may manage communications with other base station 105, and may include a controller or scheduler for controlling communications with UEs 115 in cooperation with other base stations 105. For example, the inter-station communications manager 1645 may coordinate scheduling for transmissions to UEs 115 for various interference mitigation techniques such as beamforming or joint transmission. In some examples, the inter-station communications manager 1645 may provide an X2 interface within an LTE/LTE-A wireless communication network technology to provide communication between base stations 105.

Figure 17:
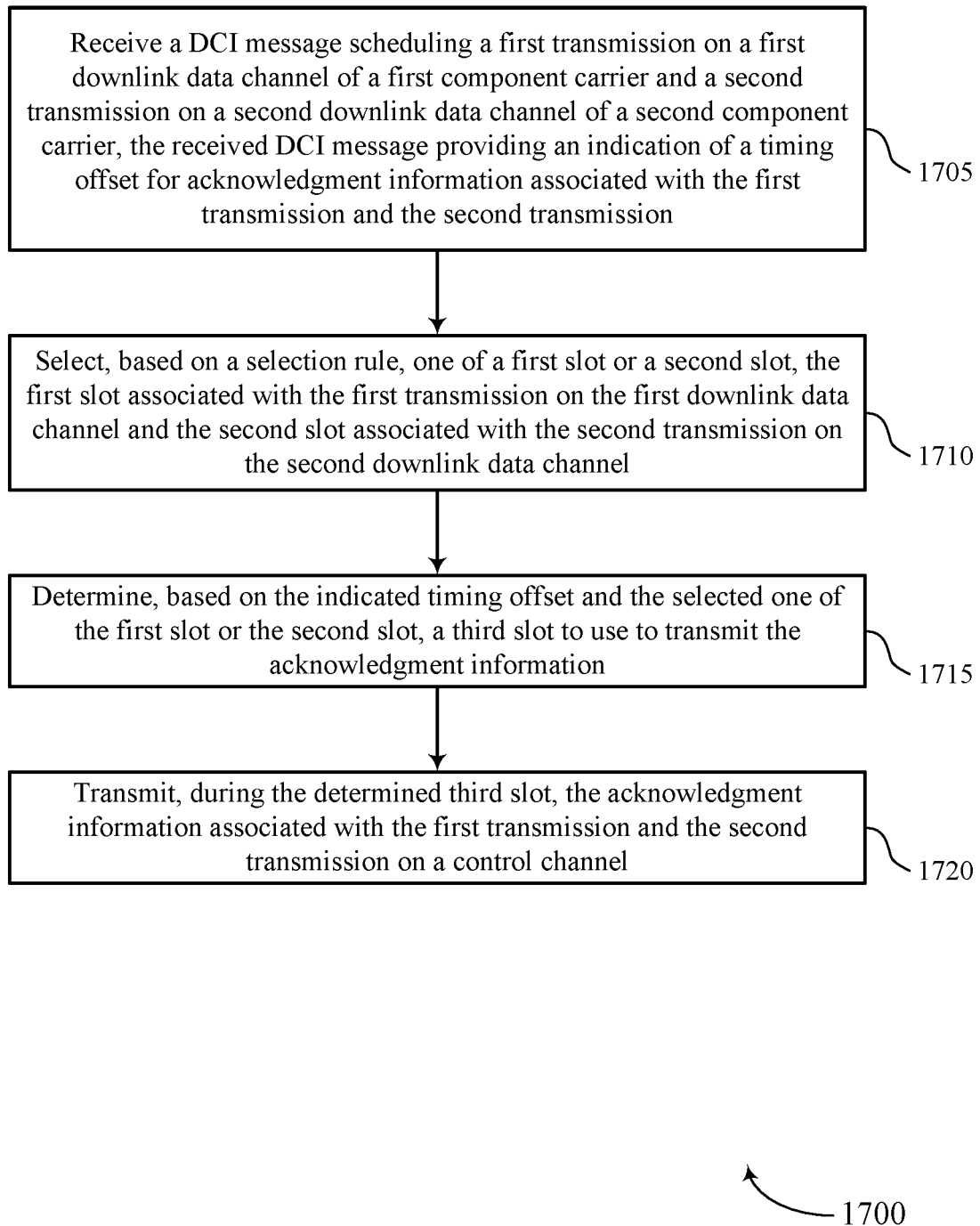
FIGS. 17 through 20 show flowcharts illustrating methods that support acknowledgement feedback for multi-component carrier scheduling in accordance with aspects of the present disclosure.

FIG. 17 shows a flowchart illustrating a method 1700 that supports acknowledgement feedback for multi-component carrier scheduling in accordance with aspects of the present disclosure. The operations of method 1700 may be implemented by a UE 115 or its components as described herein. For example, the operations of method 1700 may be performed by a UE communications manager as described with reference to FIGS. 9 through 12. In some examples, a UE may execute a set of instructions to control the functional elements of the UE to perform the functions described below. Additionally or alternatively, a UE may perform aspects of the functions described below using special-purpose hardware.

At 1705, the UE may receive a DCI message scheduling a first transmission on a first downlink data channel of a first component carrier and a second transmission on a second downlink data channel of a second component carrier, the received DCI message providing an indication of a timing offset for acknowledgement information associated with the first transmission and the second transmission. The operations of 1705 may be performed according to the methods described herein. In some examples, aspects of the operations of 1705 may be performed by a control component as described with reference to FIGS. 9 through 12.

At 1710, the UE may select, based on a selection rule, one of a first slot or a second slot, the first slot associated with the first transmission on the first downlink data channel and the second slot associated with the second transmission on the second downlink data channel. The operations of 1710 may be performed according to the methods described herein. In some examples, aspects of the operations of 1710 may be performed by a slot component as described with reference to FIGS. 9 through 12.

At 1715, the UE may determine, based on the indicated timing offset and the selected one of the first slot or the second slot, a third slot to use to transmit the acknowledgement information. The operations of 1715 may be performed according to the methods described herein. In some examples, aspects of the operations of 1715 may be performed by a slot component as described with reference to FIGS. 9 through 12.

At 1720, the UE may transmit, during the determined third slot, the acknowledgement information associated with the first transmission and the second transmission on a control channel. The operations of 1720 may be performed according to the methods described herein. In some examples, aspects of the operations of 1720 may be performed by a feedback component as described with reference to FIGS. 9 through 12.

Figure 18:
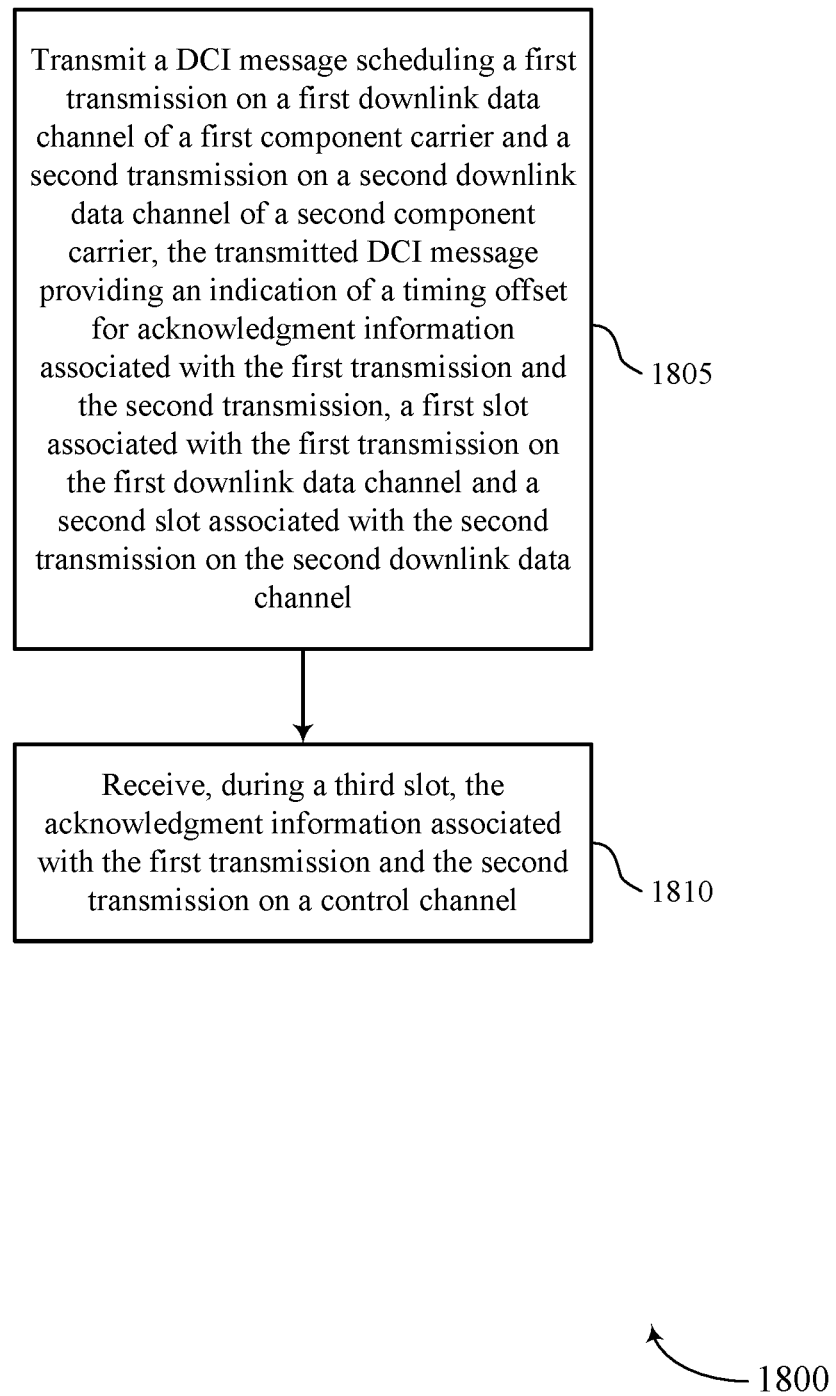

FIG. 18 shows a flowchart illustrating a method 1800 that supports acknowledgement feedback for multi-component carrier scheduling in accordance with aspects of the present disclosure. The operations of method 1800 may be implemented by a base station 105 or its components as described herein. For example, the operations of method 1800 may be performed by a base station communications manager as described with reference to FIGS. 13 through 16. In some examples, a base station may execute a set of instructions to control the functional elements of the base station to perform the functions described below. Additionally or alternatively, a base station may perform aspects of the functions described below using special-purpose hardware.

At 1805, the base station may transmit a DCI message scheduling a first transmission on a first downlink data channel of a first component carrier and a second transmission on a second downlink data channel of a second component carrier, the transmitted DCI message providing an indication of a timing offset for acknowledgement information associated with the first transmission and the second transmission, a first slot associated with the first transmission on the first downlink data channel and a second slot associated with the second transmission on the second downlink data channel. The operations of 1805 may be performed according to the methods described herein. In some examples, aspects of the operations of 1805 may be performed by a control component as described with reference to FIGS. 13 through 16.

At 1810, the base station may receive, during a third slot, the acknowledgement information associated with the first transmission and the second transmission on a control channel. The operations of 1810 may be performed according to the methods described herein. In some examples, aspects of the operations of 1810 may be performed by a feedback component as described with reference to FIGS. 13 through 16.

Figure 19:
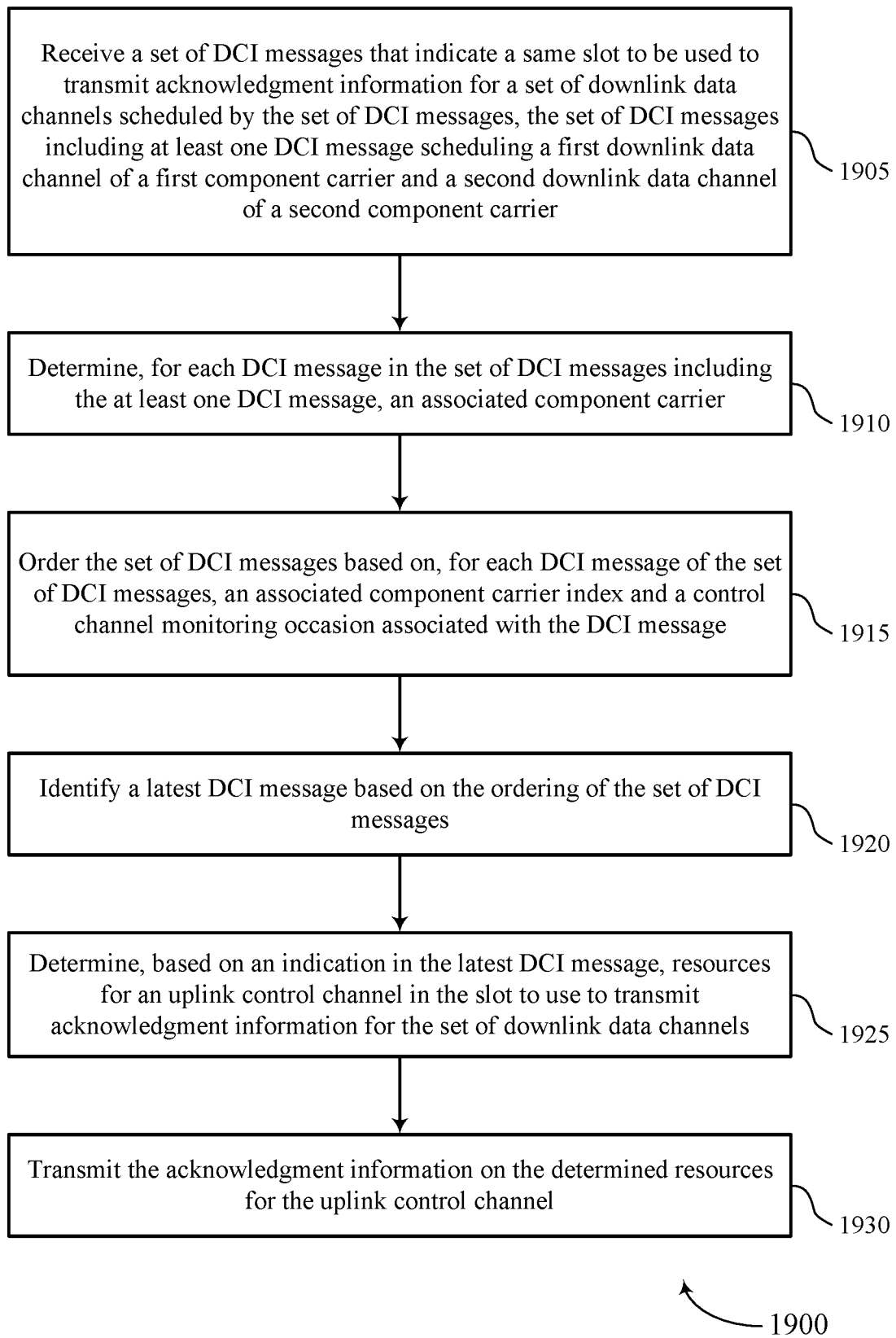

FIG. 19 shows a flowchart illustrating a method 1900 that supports acknowledgement feedback for multi-component carrier scheduling in accordance with aspects of the present disclosure. The operations of method 1900 may be implemented by a UE 115 or its components as described herein. For example, the operations of method 1900 may be performed by a UE communications manager as described with reference to FIGS. 9 through 12. In some examples, a UE may execute a set of instructions to control the functional elements of the UE to perform the functions described below. Additionally or alternatively, a UE may perform aspects of the functions described below using special-purpose hardware.

At 1905, the UE may receive a set of DCI messages that indicate a same slot to be used to transmit acknowledgement information for a set of downlink data channels scheduled by the set of DCI messages, the set of DCI messages including at least one DCI message scheduling a first downlink data channel of a first component carrier and a second downlink data channel of a second component carrier. The operations of 1905 may be performed according to the methods described herein. In some examples, aspects of the operations of 1905 may be performed by a control component as described with reference to FIGS. 9 through 12.

At 1910, the UE may determine, for each DCI message in the set of DCI messages including the at least one DCI message, an associated component carrier. The operations of 1910 may be performed according to the methods described herein. In some examples, aspects of the operations of 1910 may be performed by a carrier component as described with reference to FIGS. 9 through 12.

At 1915, the UE may order the set of DCI messages based on, for each DCI message of the set of DCI messages, an associated component carrier index and a control channel monitoring occasion associated with the DCI message. The operations of 1915 may be performed according to the methods described herein. In some examples, aspects of the operations of 1915 may be performed by an order component as described with reference to FIGS. 9 through 12.

At 1920, the UE may identify a latest DCI message based on the ordering of the set of DCI messages. The operations of 1920 may be performed according to the methods described herein. In some examples, aspects of the operations of 1920 may be performed by an order component as described with reference to FIGS. 9 through 12.

At 1925, the UE may determine, based on an indication in the latest DCI message, resources for an uplink control channel in the slot to use to transmit acknowledgement information for the set of downlink data channels. The operations of 1925 may be performed according to the methods described herein. In some examples, aspects of the operations of 1925 may be performed by a feedback component as described with reference to FIGS. 9 through 12.

At 1930, the UE may transmit the acknowledgement information on the determined resources for the uplink control channel. The operations of 1930 may be performed according to the methods described herein. In some examples, aspects of the operations of 1930 may be performed by a feedback component as described with reference to FIGS. 9 through 12.

Figure 20:
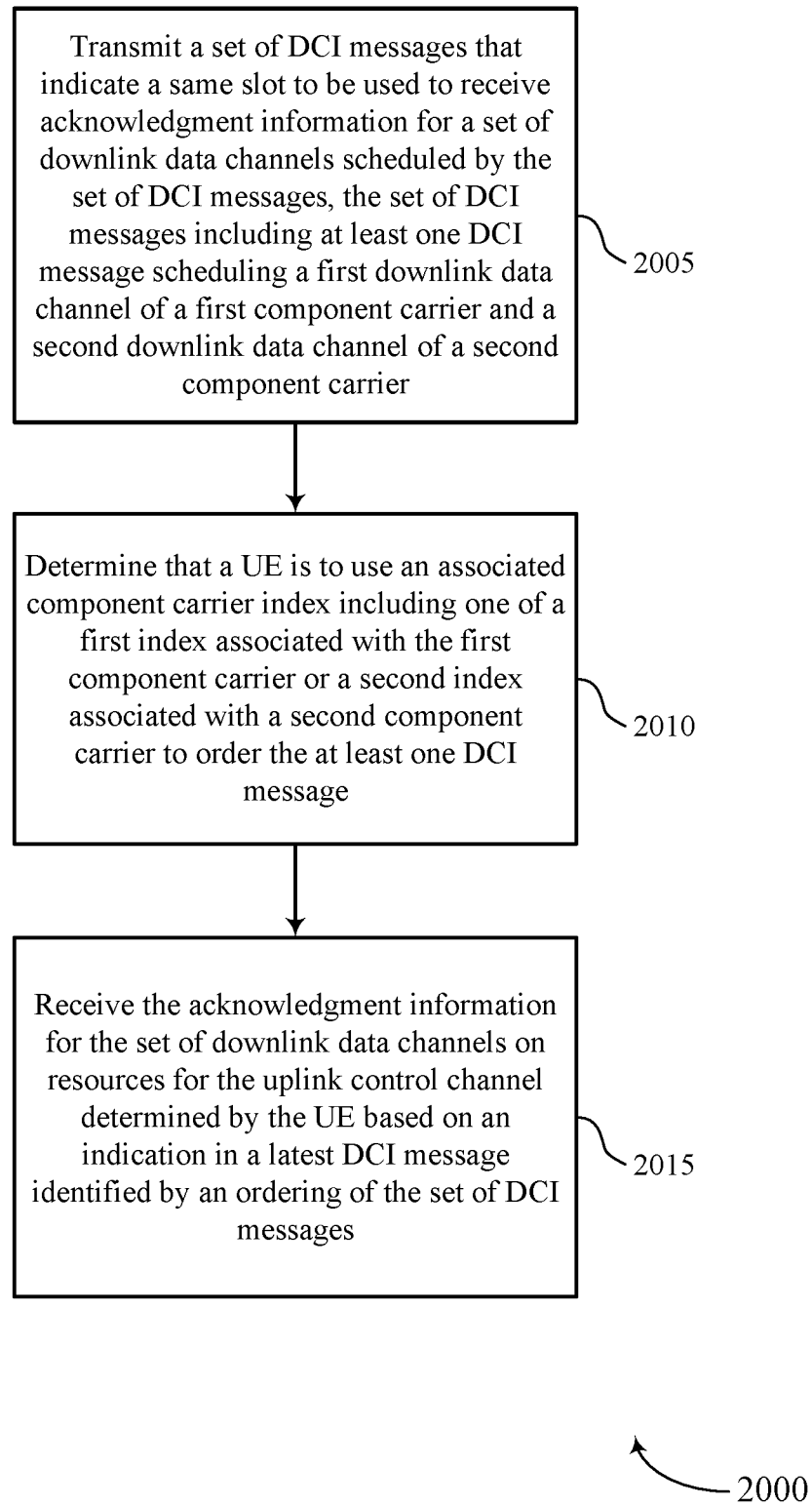

FIG. 20 shows a flowchart illustrating a method 2000 that supports acknowledgement feedback for multi-component carrier scheduling in accordance with aspects of the present disclosure. The operations of method 2000 may be implemented by a base station 105 or its components as described herein. For example, the operations of method 2000 may be performed by a base station communications manager as described with reference to FIGS. 13 through 16. In some examples, a base station may execute a set of instructions to control the functional elements of the base station to perform the functions described below. Additionally or alternatively, a base station may perform aspects of the functions described below using special-purpose hardware.

At 2005, the base station may transmit a set of DCI messages that indicate a same slot to be used to receive acknowledgement information for a set of downlink data channels scheduled by the set of DCI messages, the set of DCI messages including at least one DCI message scheduling a first downlink data channel of a first component carrier and a second downlink data channel of a second component carrier. The operations of 2005 may be performed according to the methods described herein. In some examples, aspects of the operations of 2005 may be performed by a control component as described with reference to FIGS. 13 through 16.

At 2010, the base station may determine that a UE is to use an associated component carrier index including one of a first index associated with the first component carrier or a second index associated with a second component carrier to order the at least one DCI message. The operations of 2010 may be performed according to the methods described herein. In some examples, aspects of the operations of 2010 may be performed by a carrier component as described with reference to FIGS. 13 through 16.

At 2015, the base station may receive the acknowledgement information for the set of downlink data channels on resources for the uplink control channel determined by the UE based on an indication in a latest DCI message identified by an ordering of the set of DCI messages. The operations of 2015 may be performed according to the methods described herein. In some examples, aspects of the operations of 2015 may be performed by a feedback component as described with reference to FIGS. 13 through 16.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for wireless communication at a UE, comprising: receiving a downlink control information message scheduling a first transmission on a first downlink data channel of a first component carrier and a second transmission on a second downlink data channel of a second component carrier, the received downlink control information message providing an indication of a timing offset for acknowledgement information associated with the first transmission and the second transmission; selecting, based at least in part on a selection rule, one of a first slot or a second slot, the first slot associated with the first transmission on the first downlink data channel and the second slot associated with the second transmission on the second downlink data channel; determining, based at least in part on the indicated timing offset and the selected one of the first slot or the second slot, a third slot to use to transmit the acknowledgement information; and transmitting, during the determined third slot, the acknowledgement information associated with the first transmission and the second transmission on a control channel.

Aspect 2: The method of aspect 1, wherein the first component carrier corresponds to a first subcarrier spacing and the second component carrier corresponds to a second subcarrier spacing different than the first subcarrier spacing.

Aspect 3: The method of aspect 2, wherein determining the third slot to use to transmit the acknowledgement information is based at least in part on the first subcarrier spacing or the second subcarrier spacing, or both.

Aspect 4: The method of any of aspects 1 through 3, wherein the third slot comprises a slot to transmit the acknowledgement information associated with the first transmission and the second transmission.

Aspect 5: The method of any of aspects 1 through 4, further comprising: identifying a first indicator of a set of indicators in the received downlink control information message, the first indicator comprising a first time domain resource allocation field for the first downlink data channel associated with the first component carrier; and identifying a second indicator of the set of indicators in the received downlink control information message, the second indicator comprising a second time domain resource allocation field for the second downlink data channel associated with the second component carrier, wherein determining the third slot to use to transmit the acknowledgement information is based at least in part on the first and second time domain resource allocation fields.

Aspect 6: The method of any of aspects 1 through 5, further comprising: identifying an indicator of a set of indicators in the received downlink control information message, the indicator comprising a time domain resource allocation field for both the first downlink data channel associated with the first component carrier and the second downlink data channel associated with the second component carrier, wherein determining the third slot to use to transmit the acknowledgement information is based at least in part on the time domain resource allocation field.

Aspect 7: The method of any of aspects 1 through 6, further comprising: determining, based at least in part on the received downlink control information message, a beginning slot of the first downlink data channel associated with the first component carrier, an ending slot of the first downlink data channel associated with the first component carrier, or a duration of the first downlink data channel associated with the first component carrier, or a combination thereof, wherein determining the third slot to use to transmit the acknowledgement information is based at least in part on the beginning slot of the first downlink data channel, the ending slot of the first downlink data channel, or the duration of the first downlink data channel, or a combination thereof.

Aspect 8: The method of aspect 7, further comprising: determining, based at least in part on the received downlink control information message, a beginning slot of the second downlink data channel associated with the second component carrier, an ending slot of the second downlink data channel associated with the second component carrier, or a duration of the second downlink data channel associated with the second component carrier, or a combination thereof, wherein determining the third slot to use to transmit the acknowledgement information is based at least in part on the beginning slot of the second downlink data channel, the ending slot of the second downlink data channel, or the duration of the second downlink data channel, or a combination thereof.

Aspect 9: The method of aspect 8, further comprising: scaling one or more of the beginning slot of the first downlink data channel, the ending slot of the first downlink data channel, the duration of the first downlink data channel, the beginning slot of the second downlink data channel, the ending slot of the second downlink data channel, or the duration of the second downlink data channel, or a combination thereof.

Aspect 10: The method of any of aspects 1 through 9, wherein transmitting the acknowledgement information associated with the first transmission and the second transmission on the control channel comprises: excluding, based at last in part on an absence of the timing offset in a set of timing offsets, feedback associated with the first downlink data channel or the second downlink data channel from the acknowledgement information associated with the first transmission and the second transmission on the control channel.

Aspect 11: The method of any of aspects 1 through 10, wherein the selection rule comprises selecting one of the first slot or the second slot based at least in part on the first slot occurring before the second slot.

Aspect 12: The method of any of aspects 1 through 11, wherein the selection rule comprises selecting one of the first slot or the second slot based at least in part on the first slot occurring after the second slot.

Aspect 13: The method of any of aspects 1 through 12, wherein the selection rule comprises selecting one of the first slot or the second slot based at least in part on a first component carrier index associated with the first component carrier and a second component carrier index associated with the second component carrier.

Aspect 14: A method for wireless communication at a base station, comprising: transmitting a downlink control information message scheduling a first transmission on a first downlink data channel of a first component carrier and a second transmission on a second downlink data channel of a second component carrier, the transmitted downlink control information message providing an indication of a timing offset for acknowledgement information associated with the first transmission and the second transmission, a first slot associated with the first transmission on the first downlink data channel and a second slot associated with the second transmission on the second downlink data channel; determining, based at least in part on the indicated timing offset and the selected one of the first slot or the second slot, a third slot to use to transmit the acknowledgement information; and receiving, during a third slot, the acknowledgement information associated with the first transmission and the second transmission on a control channel.

Aspect 15: The method of aspect 14, wherein the first component carrier corresponds to a first subcarrier spacing and the second component carrier corresponds to a second subcarrier spacing different than the first subcarrier spacing.

Aspect 16: The method of aspect 15, wherein receiving, during the third slot, the acknowledgement information is based at least in part on the first subcarrier spacing or the second subcarrier spacing, or both.

Aspect 17: The method of any of aspects 14 through 16, wherein the third slot comprises a slot to receive the acknowledgement information associated with the first transmission and the second transmission.

Aspect 18: The method of any of aspects 14 through 17, further comprising: assigning an indicator of a set of indicator in the transmitted downlink control information message, the indicator comprising a time domain resource allocation field for both the first downlink data channel associated with the first component carrier and the second downlink data channel associated with the second component carrier, wherein the third slot to use to receive the acknowledgement information is based at least in part on the time domain resource allocation field.

Aspect 19: The method of any of aspects 14 through 18, further comprising: assigning a first indicator of a set of indicators in the received downlink control information message, the first indicator comprising a first time domain resource allocation field for the first downlink data channel associated with the first component carrier; and assigning a second indicator of the set of indicators in the received downlink control information message, the second indicator comprising a second time domain resource allocation field for the second downlink data channel associated with the second component carrier, wherein the third slot to use to receive the acknowledgement information is based at least in part on the first and second time domain resource allocation fields.

Aspect 20: The method of any of aspects 14 through 19, wherein the acknowledgement information excludes feedback associated with the first downlink data channel or the second downlink data channel based at least in part on an absence of the timing offset in a set of timing offsets.

Aspect 21: A method for wireless communication at a UE, comprising: receiving a set of downlink control information messages that indicate a same slot to be used to transmit acknowledgement information for a set of downlink data channels scheduled by the set of downlink control information messages, the set of downlink control information messages including at least one downlink control information message scheduling a first downlink data channel of a first component carrier and a second downlink data channel of a second component carrier; determining, for each downlink control information message in the set of downlink control information messages including the at least one downlink control information message, an associated component carrier; ordering the set of downlink control information messages based at least in part on, for each downlink control information message of the set of downlink control information messages, an associated component carrier index and a control channel monitoring occasion associated with the downlink control information message; identifying a latest downlink control information message based at least in part on the ordering of the set of downlink control information messages; determining, based at least in part on an indication in the latest downlink control information message, resources for an uplink control channel in the slot to use to transmit acknowledgement information for the set of downlink data channels; and transmitting the acknowledgement information on the determined resources for the uplink control channel.

Aspect 22: The method of aspect 21, wherein the associated component carrier index is a first component carrier index corresponding to the first component carrier or a second component carrier index corresponding to the second component carrier.

Aspect 23: The method of aspect 22, further comprising: determining to use a first component carrier index for the associated component carrier index based at least in part on the first component carrier index being greater than the second component carrier index.

Aspect 24: The method of any of aspects 22 through 23, further comprising: determining to use the first component carrier index for the associated component carrier index based at least in part on the first component carrier index being less than the second component carrier index.

Aspect 25: The method of any of aspects 21 through 24, wherein the one or more component carrier indices indicated by the downlink control information message is based at least in part on a scheduling cell.

Aspect 26: The method of any of aspects 21 through 25, wherein ordering the set of downlink control information messages is based at least in part on, for each downlink control information message of the set of downlink control information messages, a scheduled cell of each downlink control information message of the set of downlink control information messages.

Aspect 27: The method of any of aspects 21 through 26, wherein the indication in the latest downlink control information message comprises a physical uplink control channel resource index (PM).

Aspect 28: A method for wireless communication at a base station, comprising: transmitting a set of downlink control information messages that indicate a same slot to be used to receive acknowledgement information for a set of downlink data channels scheduled by the set of downlink control information messages, the set of downlink control information messages including at least one downlink control information message scheduling a first downlink data channel of a first component carrier and a second downlink data channel of a second component carrier; determining that a UE is to use an associated component carrier index comprising one of a first index associated with the first component carrier or a second index associated with a second component carrier to order the at least one downlink control information message; and receiving the acknowledgement information for the set of downlink data channels on resources for the uplink control channel determined by the UE based at least in part on an indication in a latest downlink control information message identified by an ordering of the set of downlink control information messages.

Aspect 29: The method of aspect 28, wherein the ordering the set of downlink control information messages is based at least in part on a scheduling cell of each downlink control information message of the set of downlink control information messages.

Aspect 30: The method of any of aspects 28 through 29, wherein the ordering the set of downlink control information messages is based at least in part on a scheduled cell of each downlink control information message of the set of downlink control information messages.

Aspect 31: The method of any of aspects 28 through 30, wherein the indication in the latest downlink control information message comprises a physical uplink control channel resource index (PM).

Aspect 32: An apparatus for wireless communication at a UE, comprising a processor; memory coupled with the processor; and instructions stored in the memory and executable by the processor to cause the apparatus to perform a method of any of aspects 1 through 13.

Aspect 33: An apparatus for wireless communication at a UE, comprising at least one means for performing a method of any of aspects 1 through 13.

Aspect 34: A non-transitory computer-readable medium storing code for wireless communication at a UE, the code comprising instructions executable by a processor to perform a method of any of aspects 1 through 13.

Aspect 35: An apparatus for wireless communication at a base station, comprising a processor; memory coupled with the processor; and instructions stored in the memory and executable by the processor to cause the apparatus to perform a method of any of aspects 14 through 20.

Aspect 36: An apparatus for wireless communication at a base station, comprising at least one means for performing a method of any of aspects 14 through 20.

Aspect 37: A non-transitory computer-readable medium storing code for wireless communication at a base station, the code comprising instructions executable by a processor to perform a method of any of aspects 14 through 20.

Aspect 38: An apparatus for wireless communication at a UE, comprising a processor; memory coupled with the processor; and instructions stored in the memory and executable by the processor to cause the apparatus to perform a method of any of aspects 21 through 27.

Aspect 39: An apparatus for wireless communication at a UE, comprising at least one means for performing a method of any of aspects 21 through 27.

Aspect 40: A non-transitory computer-readable medium storing code for wireless communication at a UE, the code comprising instructions executable by a processor to perform a method of any of aspects 21 through 27.

Aspect 41: An apparatus for wireless communication at a base station, comprising a processor; memory coupled with the processor; and instructions stored in the memory and executable by the processor to cause the apparatus to perform a method of any of aspects 28 through 31.

Aspect 42: An apparatus for wireless communication at a base station, comprising at least one means for performing a method of any of aspects 28 through 31.

Aspect 43: A non-transitory computer-readable medium storing code for wireless communication at a base station, the code comprising instructions executable by a processor to perform a method of any of aspects 28 through 31.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
   receiving a downlink control information message scheduling a first transmission on a first downlink data channel of a first component carrier and a second transmission on a second downlink data channel of a second component carrier, the received downlink control information message providing an indication of a timing offset for acknowledgement information associated with the first transmission and the second transmission, wherein the first component carrier is different from the second component carrier;
   selecting, based at least in part on a selection rule, one of a first slot or a second slot, the first slot associated with the first transmission on the first downlink data channel and the second slot associated with the second transmission on the second downlink data channel;
   determining, based at least in part on the indicated timing offset and the selected one of the first slot or the second slot, a third slot to use to transmit the acknowledgement information; and
   transmitting, during the determined third slot using the first component carrier, the acknowledgement information associated with the first transmission and the second transmission on a control channel.

2. The method of claim 1, wherein the first component carrier corresponds to a first subcarrier spacing and the second component carrier corresponds to a second subcarrier spacing different than the first subcarrier spacing.

3. The method of claim 2, wherein determining the third slot to use to transmit the acknowledgement information is based at least in part on the first subcarrier spacing or the second subcarrier spacing, or both.

4. The method of claim 1, wherein the third slot comprises a slot to transmit the acknowledgement information associated with the first transmission and the second transmission.

5. The method of claim 1, further comprising:
   identifying a first indicator of a set of indicators in the received downlink control information message, the first indicator comprising a first time domain resource allocation field for the first downlink data channel associated with the first component carrier; and
   identifying a second indicator of the set of indicators in the received downlink control information message, the second indicator comprising a second time domain resource allocation field for the second downlink data channel associated with the second component carrier, wherein determining the third slot to use to transmit the acknowledgement information is based at least in part on the first time domain resource allocation field and the second time domain resource allocation field.

6. The method of claim 1, further comprising:
   identifying an indicator of a set of indicators in the received downlink control information message, the indicator comprising a time domain resource allocation field for both the first downlink data channel associated with the first component carrier and the second downlink data channel associated with the second component carrier,
   wherein determining the third slot to use to transmit the acknowledgement information is based at least in part on the time domain resource allocation field.

7. The method of claim 1, further comprising:
   determining, based at least in part on the received downlink control information message, a beginning slot of the first downlink data channel associated with the first component carrier, an ending slot of the first downlink data channel associated with the first component carrier, or a duration of the first downlink data channel associated with the first component carrier, or a combination thereof,
   wherein determining the third slot to use to transmit the acknowledgement information is based at least in part on the beginning slot of the first downlink data channel, the ending slot of the first downlink data channel, or the duration of the first downlink data channel, or a combination thereof.

8. The method of claim 7, further comprising:
   determining, based at least in part on the received downlink control information message, a beginning slot of the second downlink data channel associated with the second component carrier, an ending slot of the second downlink data channel associated with the second component carrier, or a duration of the second downlink data channel associated with the second component carrier, or a combination thereof,
   wherein determining the third slot to use to transmit the acknowledgement information is based at least in part on the beginning slot of the second downlink data channel, the ending slot of the second downlink data channel, or the duration of the second downlink data channel, or a combination thereof.

9. The method of claim 8, further comprising:
   scaling one or more of the beginning slot of the first downlink data channel, the ending slot of the first downlink data channel, the duration of the first downlink data channel, the beginning slot of the second downlink data channel, the ending slot of the second downlink data channel, or the duration of the second downlink data channel, or a combination thereof.

10. The method of claim 1, wherein transmitting the acknowledgement information associated with the first transmission and the second transmission on the control channel comprises:
excluding, based at last in part on an absence of the timing offset in a set of timing offsets, feedback associated with the first downlink data channel or the second downlink data channel from the acknowledgement information associated with the first transmission and the second transmission on the control channel.

11. The method of claim 1, wherein the selection rule comprises selecting one of the first slot or the second slot based at least in part on the first slot occurring before the second slot.

12. The method of claim 1, wherein the selection rule comprises selecting one of the first slot or the second slot based at least in part on the first slot occurring after the second slot.

13. The method of claim 1, wherein the selection rule comprises selecting one of the first slot or the second slot based at least in part on a first component carrier index associated with the first component carrier and a second component carrier index associated with the second component carrier.

14. A method for wireless communication at a base station, comprising:
transmitting a downlink control information message scheduling a first transmission on a first downlink data channel of a first component carrier and a second transmission on a second downlink data channel of a second component carrier, the transmitted downlink control information message providing an indication of a timing offset for acknowledgement information associated with the first transmission and the second transmission, a first slot associated with the first transmission on the first downlink data channel and a second slot associated with the second transmission on the second downlink data channel, wherein the first component carrier is different from the second component carrier;
determining, based at least in part on the timing offset and one of the first slot or the second slot, a third slot for receiving the acknowledgement information; and
receiving, during the third slot of the first component carrier, the acknowledgement information associated with the first transmission and the second transmission on a control channel.

15. The method of claim 14, wherein the first component carrier corresponds to a first subcarrier spacing and the second component carrier corresponds to a second subcarrier spacing different than the first subcarrier spacing.

16. The method of claim 15, wherein receiving, during the third slot, the acknowledgement information is based at least in part on the first subcarrier spacing or the second subcarrier spacing, or both.

17. The method of claim 14, wherein the third slot comprises a slot to receive the acknowledgement information associated with the first transmission and the second transmission.

18. The method of claim 14, further comprising:
assigning an indicator of a set of indicator in the transmitted downlink control information message, the indicator comprising a time domain resource allocation field for both the first downlink data channel associated with the first component carrier and the second downlink data channel associated with the second component carrier,
wherein the third slot to use to receive the acknowledgement information is based at least in part on the time domain resource allocation field.

19. The method of claim 14, further comprising:
assigning a first indicator of a set of indicators in the transmitted downlink control information message, the first indicator comprising a first time domain resource allocation field for the first downlink data channel associated with the first component carrier; and
assigning a second indicator of the set of indicators in the transmitted downlink control information message, the second indicator comprising a second time domain resource allocation field for the second downlink data channel associated with the second component carrier, wherein the third slot to use to receive the acknowledgement information is based at least in part on the first time domain resource allocation field and the second time domain resource allocation field.

20. The method of claim 14, wherein the acknowledgement information excludes feedback associated with the first downlink data channel or the second downlink data channel based at least in part on an absence of the timing offset in a set of timing offsets.

21. An apparatus for wireless communication, comprising:
a processor,
memory coupled with the processor; and
instructions stored in the memory and executable by the processor to cause the apparatus to:
receive a downlink control information message scheduling a first transmission on a first downlink data channel of a first component carrier and a second transmission on a second downlink data channel of a second component carrier, the received downlink control information message providing an indication of a timing offset for acknowledgement information associated with the first transmission and the second transmission, wherein the first component carrier is different from the second component carrier;
select, based at least in part on a selection rule, one of a first slot or a second slot, the first slot associated with the first transmission on the first downlink data channel and the second slot associated with the second transmission on the second downlink data channel;
determine, based at least in part on the indicated timing offset and the selected one of the first slot or the second slot, a third slot to use to transmit the acknowledgement information; and
transmit, during the determined third slot using the first component carrier, the acknowledgement information associated with the first transmission and the second transmission on a control channel.

22. The apparatus of claim 21, wherein the first component carrier corresponds to a first subcarrier spacing and the second component carrier corresponds to a second subcarrier spacing different than the first subcarrier spacing, wherein determining the third slot to use to transmit the acknowledgement information is based at least in part on the first subcarrier spacing or the second subcarrier spacing, or both.

23. The apparatus of claim 21, wherein the instructions are further executable by the processor to cause the apparatus to:

identify a first indicator of a set of indicators in the received downlink control information message, the first indicator comprising a first time domain resource allocation field for the first downlink data channel associated with the first component carrier; and identify a second indicator of the set of indicators in the received downlink control information message, the second indicator comprising a second time domain resource allocation field for the second downlink data channel associated with the second component carrier, wherein determining the third slot to use to transmit the acknowledgement information is based at least in part on the first time domain resource allocation field and the second time domain resource allocation field.

24. The apparatus of claim 21, wherein the instructions are further executable by the processor to cause the apparatus to:

identify an indicator of a set of indicators in the received downlink control information message, the indicator comprising a time domain resource allocation field for both the first downlink data channel associated with the first component carrier and the second downlink data channel associated with the second component carrier, wherein determining the third slot to use to transmit the acknowledgement information is based at least in part on the time domain resource allocation field.

25. An apparatus for wireless communication, comprising:

a processor;
memory coupled with the processor; and
instructions stored in the memory and executable by the processor to cause the apparatus to:
transmit a downlink control information message scheduling a first transmission on a first downlink data channel of a first component carrier and a second transmission on a second downlink data channel of a second component carrier, the transmitted downlink control information message providing an indication of a timing offset for acknowledgement information associated with the first transmission and the second transmission, a first slot associated with the first transmission on the first downlink data channel and a second slot associated with the second transmission on the second downlink data channel, wherein the first component carrier is different from the second component carrier; and
receive, during a third slot of the first component carrier, the acknowledgement information associated with the first transmission and the second transmission on a control channel.

26. The apparatus of claim 25, wherein the first component carrier corresponds to a first subcarrier spacing and the second component carrier corresponds to a second subcarrier spacing different than the first subcarrier spacing, wherein receiving, during the third slot, the acknowledgement information is based at least in part on the first subcarrier spacing or the second subcarrier spacing, or both.

27. The apparatus of claim 25, wherein the third slot comprises a slot to receive the acknowledgement information associated with the first transmission and the second transmission.

28. The apparatus of claim 25, wherein the instructions are further executable by the processor to cause the apparatus to:

assign an indicator of a set of indicator in the transmitted downlink control information message, the indicator comprising a time domain resource allocation field for both the first downlink data channel associated with the first component carrier and the second downlink data channel associated with the second component carrier, wherein the third slot to use to receive the acknowledgement information is based at least in part on the time domain resource allocation field.

29. The apparatus of claim 25, wherein the instructions are further executable by the processor to cause the apparatus to:

assign a first indicator of a set of indicators in the transmitted downlink control information message, the first indicator comprising a first time domain resource allocation field for the first downlink data channel associated with the first component carrier; and assign a second indicator of the set of indicators in the transmitted downlink control information message, the second indicator comprising a second time domain resource allocation field for the second downlink data channel associated with the second component carrier, wherein the third slot to use to receive the acknowledgement information is based at least in part on the first time domain resource allocation field and the second time domain resource allocation field.

30. The apparatus of claim 25, wherein the acknowledgement information excludes feedback associated with the first downlink data channel or the second downlink data channel based at least in part on an absence of the timing offset in a set of timing offsets.

* * * * *